United States Patent [19]

Gillis et al.

[11] Patent Number: 4,983,659

[45] Date of Patent: * Jan. 8, 1991

[54] REACTION INJECTION MOLDING COMPOSITIONS

[75] Inventors: Herbert R. Gillis, Sterling Heights, Mich.; Malcolm Hannaby, Louvain, Belgium

[73] Assignee: ICI Americas Inc., Wilmington, Del.

[ * ] Notice: The portion of the term of this patent subsequent to Dec. 27, 2005 has been disclaimed.

[21] Appl. No.: 287,940

[22] Filed: Dec. 21, 1988

Related U.S. Application Data

[63] Continuation-in-part of Ser. No. 160,647, Feb. 26, 1988, Pat. No. 4,794,129, which is a continuation-in-part of Ser. No. 105,641, Oct. 6, 1987, abandoned.

[30] Foreign Application Priority Data

Mar. 31, 1988 [GB] United Kingdom ............... 8807684

[51] Int. Cl.$^5$ .............................................. C08L 75/04
[52] U.S. Cl. ................................ 524/186; 252/182.23
[58] Field of Search ................... 524/186; 252/182.23

[56] References Cited

U.S. PATENT DOCUMENTS 4,794,129 12/1988 Gillis et al. ............................ 528/73

Primary Examiner—Maurice J. Welsh

[57] ABSTRACT

Compositions of matter used as reaction systems in RIM processes. Useful for the production of polymeric materials such as molded articles. The articles comprise the product of the reaction of an aromatic isocyanate with an imino-functional isocyanate-reactive composition.

10 Claims, No Drawings

REACTION INJECTION MOLDING COMPOSITIONS

This is a continuation-in-part of application Ser. No. 07/160,647 filed Feb. 26, 1988, now U.S. Pat. No. 4,794,129 which is a continuation-in-part of application Ser. No. 07/105,641 filed Oct. 6, 1987, now abandoned.

FIELD OF THE INVENTION

This invention relates to compositions of matter used as reaction systems to make moldings by a reaction injection molding (RIM) process. The systems are useful for the production of polymeric materials, specifically molded articles. The molded polymeric articles comprise the product of the direct reaction of an aromatic isocyanate with an imino-functional isocyanate-reactive composition.

BACKGROUND OF THE INVENTION

Reaction injection molded polyurea elastomers currently define an advanced state of the art in RIM technology. These polymeric materials are molded from reaction systems which generally consist of two components, a polyisocyanate (which is usually aromatic), and a mixture of aromatic and aliphatic polyamines. The polyureas represent a major technological advance over earlier types of RIM systems (i.e. polyurethanes, urethane ureas, and polyamides) in that they offer a combination of superior material properties (i.e. heat resistance, moisture resistance, dimensional stability), with improved productivity (i.e. shorter mold-resistance times).

Conventional polyurea reaction injection molding (RIM) elastomer formulations are well known to the art. See, for example, U.S. Pat. Nos. 4,433,067, 4,396,729, 4,474,901, 4,444,910, 4,448,904, and European published patent application No. 0081701.

These polyurea RIM systems are "fast" systems in that they tend to gel early. They do not fill large, geometrically complex molds without very high injection rates. Because of the fast gel times flow/fill problems frequently arise and can be particularly severe with formulations having theoretical hardblock levels above about 35% and containing primary aliphatic amines in the formulation. In particular, formulations above 35% hardblock which contain aliphatic amine-terminated polyether resins as the source of the softblock, or as added chain extenders, can present difficult processing problems. Formulations containing such aliphatic amine-terminated polyether resins are widely used in state of the art polyurea RIM technology.

In general, state-of-the-art polyurea systems which contain primary aliphatic amine groups exhibit poorer flow/fill characteristics than older prior art polyurethane-urea RIM systems, such as that described in U.S. Pat. No. 4,218,543. These older systems are similar to state-of-the-art polyurea systems in that they contain a sterically hindered aromatic diamine as a principal chain extender, but they do not generally require or contain primary aliphatic amine-containing species. Consequently not only do these older prior art systems exhibit better flow-fill characteristics, they generally also exhibit better mixing and are usually less demanding to process than current generation polyurea systems (i.e., when compared under similar conditions and at the same hardblock levels).

Conversely, apart from the disadvantages described above, state-of-the-art polyurea systems have several advantages over prior art polyurethane-urea systems. In particular they generally exhibit lower mold residence times, hence better productivity, and better physical properties can be obtained with the polyureas. In addition, the polyureas are more "robust", i.e. they can tolerate acidic additives because they do not depend upon sensitive catalysts as do the polyurethaneureas. The polyureas, as known in the art, are distinguished from the polyurethaneureas most fundamentally by the fact that substantially no urethane linkages are formed during the reaction injection molding (RIM) operation.

It would be desirable to have polyurea RIM systems which exhibit flow-fill and mixing characteristics which are better than those of existing polyureas and, preferably, at least comparable to prior-art polyurethaneurea systems. Speaking more generally, it would be highly desirable to have RIM processable reaction systems which offer at least some of the advantages of polyureas (i.e. heat resistance, robustness, short mold-residence times), without the disadvantages characteristic of the known polyurea systems (poor flow).

It would be preferable, however, that this improvement in flow not be achieved at the expense of much longer mold residence times. The requirements for improved flow/fill characteristics and constant mold-residence time are mutually contradictory unless the reaction profile of such systems is changed. Simply reducing reactivity tends to decrease the flow/fill problems which naturally stem from the fast gel times of state-of-the-art polyurea systems, but also disadvantageously tends to increase the minimum necessary mold residence time.

State-of-the-art polyurea systems are faster than the earlier polyurethane-urea systems for a number of reasons, one being, as mentioned the presence of fast-reacting primary aliphatic amine species which can react with aromatic isocyanates more than 100 times faster than aromatic amine chain extenders, such as diethyl toluene diamine, DETDA, normally used in polyurea and polyurethane urea RIM systems. State of the art polyureas generally have a higher cohesive energy density (CED), hence higher Tg, than corresponding polyurethaneureas of the prior art. The higher CED, coupled with higher chemical reactivity, make the polyureas gel faster than polyurethane-ureas. Often the gels which are first formed are physical rather than chemical gels. Physical gelation can be particularly problematic in polyurea systems which contain relatively high concentrations of aliphatic amine species, especially lower molecular weight aliphatic amine species. In polyurea systems which form distinct two-phase elastomers, phase separation may further interfere with flow/fill and mixing. Phase separation can occur very early if reactivity is high.

SUMMARY OF THE INVENTION

This invention provides reaction systems for use in making polymers by the reaction injection molding process, said system comprising the following reaction components:

(A) an organic aromatic polyisocyanate: and (B) an isocyanate-reactive composition comprising at least one imino-functional compound which has at least one imino group that is directly reactive towards isocyanates and which conforms to the following structure

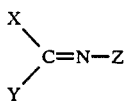

wherein

X, Y, and Z are chemical moieties which collectively form the rest of said compound and are each independently selected from the group consisting of H and organic radicals which are attached to the imino unit

of said compound through N, C, O, S, Si or P;

the central carbon atom of said imino unit is bonded to three atoms; and said system is used to make a polymer by impingement mixing a stream comprising said reaction component (A) and a stream comprising said reaction component (B).

In the above reaction system, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through an atom selected from C, N, and O. It is most preferred that X, Y and Z are attached through saturated atoms, preferably aliphatic carbon atoms. It is also preferred that component (B) constitute at least 20% by weight of all reactive components in the system, and that the imino-functional compounds constitute at least 5%, preferably at least 8%, by weight of the total reaction system.

In a preferred embodiment this invention provides a reaction system used to make polymers by a reaction injection molding process, comprising (A) an aromatic polyisocyanate which has a number-averaged isocyanate functionality of from about 1.8 to about 4.0 and a number-averaged molecular weight of from about 120 to about 1800, wherein more than 50 mole percent of the reactive isocyanate (—NCO) groups of said polyisocyanate are bonded directly to aromatic rings and at least 50 mole percent of the species comprising said polyisocyanate are diisocyanates; and B. an isocyanate-reactive composition comprising (i) a chain extender comprising (a) 0–100% of an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and, correspondingly, (b) 100–0% of an imino-functional compound having a number-averaged molecular weight less than 1500 and a number-averaged functionality of isocyanate-reactive imino units of about 1 to about 3, and (ii) an imino-functional polyether resin having an average of from about 1.1 to about 5 isocyanate-reactive imino groups per molecule and a number-averaged molecular weight of from 1500 to about 10,000, wherein said imino groups constitute at least 50 mole percent of the isocyanate-reactive groups in said polyether resin, and at least 50 mole percent of said imino-functional polyether species contain two or more imino (C=N) groups per molecule;

wherein said system is used to make a polymer by impingement mixing a stream comprising said reaction component (A) and a stream comprising said reaction component (B).

It is within the scope of the invention to have reactant B(ii) assume any weight fraction of the total B component. It is preferred, however, that the weight ratio of reactant B(i) to reactant B(ii) be in the range of about 9:1 to about 1:9, and most preferred that this ratio be in the range of 8:2 to 2:8.

It is preferred that the weight ratio of chain extender component B(i)(b) to chain extender component B(i)(a) be between about 0 and about 10, preferably between 0.1 and 5, and most preferably between 0.25 and 2.

It is further within the scope of the invention to use a softblock component, B(ii) which is not imino functional in conjunction with an imino functional chain extender, or to pre-react the (imino functional or non-imino functional) softblock component with a stoichiometric excess of the polyisocyanate "A" component, thereby forming an isocyanate-terminated prepolymer. In such an embodiment this invention provides a RIM reaction system comprising:

A. an aromatic polyisocyanate which has a number averaged isocyanate functionality of from about 1.8 to about 4.0 and a number- averaged molecular weight of at least about 120, wherein more than 50 mole percent of the reactive isocyanate (—NCO) groups of said polyisocyanate are bonded directly to aromatic rings and at least 50 mole percent of the species comprising said polyisocyanate are diisocyanates; and B. an isocyanate-reactive composition comprising (i) a chain extender comprising an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and (ii) an imino-functional chain extender having a molecular weight less than about 600 and a number-averaged functionality of imino units between about 1 and about 2.5, said imino groups being capable of reacting directly with isocyanates, wherein the ratio by weight of component B(i) and B(ii) being between about 1:9 and about 9:1.

In a preferred embodiment this invention also provides a substantially moisture-free isocyanate-reactive composition comprising the following isocyanate-reactive components (i) an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines: and (ii) an imine-terminated aliphatic polyether having an average of from about 1.1 to about 4 imine

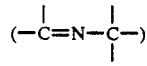

groups per molecule and a number-averaged molecular weight of from about 1500 to about 10,000, wherein said imine groups are capable of reacting directly with isocyanates, and wherein said imine groups constitute at least 50 mole percent of isocyanate-reactive functional groups in said polyether and at least 50 mole percent of the imine-terminated species comprising said mixture are di-imines and/or tri-imines, the weight ratio of said reactant (i) to said reactant (ii) being in the range of about 9:1 to about 1:9.

Another embodiment according to this invention provides a chain extender mixture, component B(i), comprising an aromatic polyamine and an iminofunctional chain extender capable of reacting directly with isocyanates, wherein said chain extender contains (at least one isocyanate reactive imino (C=N) unit per molecule and has a number-averaged molecular weight less than 1500, preferably between about 100 and about 600, wherein the reactive imino groups conform to the range of structures defined hereinabove, and wherein the ratio by weight of said imino functional chain extender to said aromatic polyamine in component B(i) is preferably between about 9:1 and 1:9, more preferably between 8:2 and 2:8. In a preferred embodiment the imino groups of said imino functional chain extender are simple imines.

This invention further provides polyureas and molded articles made therefrom using the reaction systems and isocyanate-reactive compositions noted above.

"Reaction System" as used herein means a system or assemblage of reaction components which, in the system, are unreacted but which, in use, are reacted with each other in a device which provides for impingement mixing, to form a molded product.

"RIM" as used herein refers to a reaction injection molding process wherein the reactants, present as a polyisocyanate "A" component and an isocyanate-reactive "B" component, are impingement mixed and injected into a closed mold.

"Moisture free conditions" and "moisture free" as used above means that the reactants employed are substantially anhydrous and that the processing equipment used is also substantially anhydrous.

"Polymer", as used herein and in the claims, means the reaction product of a reaction system according to this invention. Such polymers contain at least one moiety or portion derived from the reaction of an isocyanate group with an imino group. Such polymers can also contain other groups or linkages such as urethane, biuret, allophanate, triazine, and or isocyanurate groups.

"Directly reactive" as applied to the imino functional compounds useful herein means that the imino groups are capable of reacting with aromatic isocyanate groups in such a way as to form at least one chemical bond between the groups without prior cleavage or hydrolysis of the imino groups. Hence, no byproducts are produced in the reaction. The site of bond formation may be at either of the atoms of the imino unit, the atoms attached directly to the imino unit, or both.

The term "polyisocyanate" encompasses mixtures comprising two or more species of isocyanate, as well as compositions consisting of a single polyisocyanate species. The terms "an aromatic polyamine", "an imine-terminated aliphatic polyether" and "an imino-functional chain extender" are used in like manner, i.e. to denote mixtures of species as well as single species thereof.

The terms "alkyl", "alkylene", and "aliphatic" used herein refer to cyclic as well as acyclic non-aromatic organic structures, i.e., structures or molecules which are free of aromatic rings and not part of aromatic rings.

"Imino-functional" as used herein means that a reactant contains the imino group

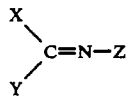

as defined above, wherein said group is capable of reacting directly with isocyanate groups. Preferred classes of imino-functional groupings include imines, oxazolines, imidazolines, N-alkyl imidazolines, oxazines, diazines, imino-esters, amidines, imidines, isoureas and guanidines, as hereinafter further defined.

Molecular weights referred to herein above about 400 to 500 can be determined for all compounds by gel permeation chromatography. For lower molecular weight active hydrogen compounds, titration (direct with acids such as HCl or $HNO_3$ for amines, back titration with KOH for polyols) can be used and is well known. Direct acid titration can also be used for (low or high) imino-compound molecular weight determination.

The reaction systems of this invention are generally processed in bulk to form a solid polymer in a single step from the liquid monomeric components A and B. Generally, no solvent is used to moderate reaction rate. This does not, however, preclude the use of certain ingredients normally used in the processing of bulk thermosetting polyurethanes; polyureas, and related isocyanate-derived polymers of the prior art which are also prepared by impingement mixing. These additives are known to those skilled in the art, and includes monomeric liquids such as plasticizers, flame retardants, catalysts, volatile blowing agents and the like.

The range of imino functional reagents which may be used in the invention are not limited by or to any particular chemistry for the preparation of said reagents. For example, imine terminated aliphatic polyethers may be made by a number of different routes. Specifically, the amine groups ($-NH_2$) of an aliphatic amine-terminated polyether can be prereacted with an aldehyde ($RCH_2CHO$) or a ketone ($R^1-CO-R^2$) to form, respectively, the corresponding aldimine

or the corresponding ketimine

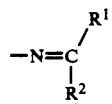

wherein R, $R^1$, and $R^2$ are hereinafter subsequently defined, or the aldehyde and/or ketone groups, of an aldehyde and/or ketone-terminated polyether, can be prereacted with an aliphatic primary mono-amine to form, respectively, the corresponding aldimine and/or ketimine-terminated polyethers:

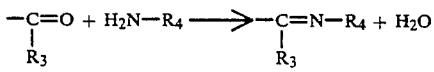

wherein: $R_3$=H or alkyl, $R_4$=H or alkyl, $R_3$ and $R_4$ being more fully defined hereinafter.

The direct reaction of compounds containing isocyanate groups with compounds containing imine groups is known, see "New Developments in Polyketimine-Polyisocyanate Chemistry and Their Application"; ACS-PMSE preprints; Fall-1986 meeting; pp 448–456, U.S. Pat. No. 3,789,045 and GB Patent No. 1286246. It is also known to react polyisocyanates with polyamines in a reaction moderating solvent such as ketone or aldehyde solvents, see U.S. Pat. No. 3,892,696 to Wood and U.S. Pat. No. 3,897,585 (also to Wood) which is a continuation-in-part thereof. It is also known to react aliphatic polyisocyanates with mixtures of polyamines and polyimines as disclosed in U.S. Pat. No. 4,554,299 to Ligget. It is also well known to react polyisocyanates with polyimines in the presence of moisture whereby the purpose of the moisture is to hydrolyze the imine and liberate free amine which in turn reacts with the isocyanate present. This indirect process of reacting polyimines and polyisocyanates is described, for example, in European Pat. No. 149,765 to Arendt. It is not useful for RIM. Such indirect reactions are outside the scope of this invention.

So far as the inventors are aware, the prior art does not disclose the reaction, of an aromatic polyisocyanate with a mixture comprising an aromatic polyamine and an aliphatic imine-terminated polyether (or other types of imino-functional species), nor the unique suitability of this reaction for use in a reaction injection molding process. Speaking more generally, the direct reaction of imino-functional species with isocyanates in a RIM process does not appear to have been explored in the prior art.

DETAILED DISCUSSION

It has now been found, surprisingly, that at least some of the imino functional reactants herein have a much more desirable reactivity profile than the amines (particularly primary aliphatic amines) now used in polyurea RIM. Specifically, the imines in question do not begin reacting rapidly with aromatic isocyanates at the point of mixing (as do the amines conventionally used). Instead, there is an induction period of short duration, typically about one to about three seconds, during which the reaction to form a polymer does not occur or is very slow. This induction period is followed by a very sudden and rapid reaction. This type of two-stage reaction profile is ideal for RIM because mixing and filling can be accomplished during the induction period and the sudden, rapid, polymerization which follows permits a very short mold residence time. The reaction of the imines used in this invention with aromatic isocyanates is "direct". No volatile or monomeric by-products are formed in the reaction. The imines are generally low viscosity materials, which enable them desirably to act as flow modifying agents during the induction period.

"A" Component

Polyisocyanates

The organic polyisocyanates, component (A), useful in this invention have a number-averaged isocyanate functionality from 1.8 to 4.0, preferably from 1.9 to 2.3, and a number-averaged molecular weight between about 120 and about 1800, preferably between about 170 and about 800. At least 50 mole percent, preferably at least 90 mole percent, of isocyanate groups in the species comprising the polyisocyanate are bonded directly to aromatic rings. At least 50 mole percent, preferably at least 70 mole percent, of the species comprising the polyisocyanate are diisocyanates.

Suitable aromatic polyisocyanates include, for example, p-phenylene diisocyanate: m-phenylene diisocyanate: 2,4-toluene diisocyanate; 2,6-toluene diisocyanate: naphthalene diisocyanate: dianisidine diisocyanate: polymethylene polyphenyl polyisocyanates; 2,4'-diphenylmethane diisocyanate (2,4'-MDI); 4,4'-diphenylmethane diisocyanate (4,4'-MDI); 3,3'-dimethyl-4,4'-biphenylene diisocyanate; polydiphenylmethane diisocyanate having a functionality greater than 2, mixtures thereof and the like. The MDI isomers (2,4' and 4,4') and mixtures and derivatives thereof are most preferred.

The polyisocyanate may include minor amounts of aliphatic polyisocyanates. Suitable aliphatic polyisocyanates include isophorone diisocyanate; 1,6-hexamethylene diisocyanate 1,4-cyclohexyl diisocyanate: saturated analogous of the above mentioned aromatic polyisocyanates, mixtures thereof and the like.

Suitable uretonimine-modified polyisocyanates can be used and are prepared by a process wherein an aromatic polyisocyanate is heated to a temperature exceeding the melting temperature of the polyisocyanate, for example, 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate-terminated prepolymers can be used and are prepared by reacting an excess of polyisocyanate with polyols, which may include aminated polyols. Suitable polyols include, for example:

(a) polyether polyols and/or hydrocarbon-based polyols having a molecular weight from 60 to 400, and an average hydroxyl functionality from 1.9 to 2.5;

(b) polyether (and/or thioether) polyols having a molecular weight of at least 400, preferably 1000 or higher, and an average hydroxyl functionality from 1.9 to 4:

(c) polyester polyols having a molecular weight from 100 to 1000, and an average hydroxyl functionality from 1.9 to 2.5;

(d) polyester polyols having a molecular weight greater than 1000, and an average hydroxyl functionality from 1.9 to 4:

(e) amine terminated polyethers having a molecular weight of at least 1000, and an average amine hydrogen functionality from 1.9 to 8.

Examples of suitable polyether or hydrocarbon polyols having a molecular weight from 60 to 400 include propylene glycol; dipropylene glycol; tripropylene glycol 2,3-butanediol; 1,3-butanediol, 2,2-dimethyl-1,3-propanediol and polypropylene glycols.

Examples of suitable polyether polyols having a molecular weight of at least 400, preferably 1000 or higher, include polyethylene glycols; polyoxyethylene polyoxypropylene copolymer diols; and polytetramethylene glycols, higher polypropylene glycols, polyoxypropylene triols, etc. The polyoxypropylene based polyols are preferred.

Examples of suitable polyester polyols having a molecular weight from 100 to 1000 include aliphatic polyester diols, and aromatic polyester diols. These polyester diols are obtained from the reaction of dibasic carboxylic acids such as succinic, adipic, suberic, azelic, phthalic, isophthalic, and the like, with alkylene glycols and oxyalkylene glycols to form the corresponding polyalkylene, and polyoxyalkylene ester diols or copolymers thereof. Examples of suitable polyester polyols having a molecular weight of at least 1000 include the polyester diols and triols obtained from the reaction of polybasic carboxylic acids, and alkylene polyols and-/or oxyalkylene polyols, to form the corresponding polyalkylene and polyoxyalkylene esters or copolymers thereof having a molecular weight of at least 1000. The polybasic carboxylic acids used may be aliphatic, aromatic, or both.

Mixtures of several species from the above (a)–(e) and the like may be used to prepare prepolymers for use in the A component. Mixtures of species of type (b) with species of type (e) are preferred.

Examples of suitable amine terminated polyethers having a molecular weight of at least 1000 include polypropylene oxide triamines, polyoxypropylene diamines, and polyoxyethylene/polyoxypropylene copolymer diamines and triamines.

It is preferred that the (A) stream component contain a "softblock" prepolymer, i.e. a high (1000 or higher) molecular weight polyether and/or polyester segment. It is preferred that at least about one third, preferably at least 40%, by weight of the total softblock in the polymer be derived from the (A) component. High molecular weight aliphatic polyether species (i.e., categories (b) and/or (e) above) are preferred, particularly if the molecular weight of the species is about 2000 to 6000 and the reactive functionality is about 2 to about 8. The (A) stream can contain a carboxylic acid (e.g. a fatty acid such as lauric, stearic, palmitic, oleic, and the like) or latent acid (e.g. an anhydride of any of the preceding acids or cyclic acid anhydrides, such as cis-1,2-cyclohexane-dicarboxylic acid anhydride) to promote the reaction between the polyisocyanate and aliphatic imino-functional ingredients from stream (B). The level of such acids can be about 0.01 to 4% by weight of the total polymer. The range of total softblock content in the polymer material (as a percent by weight of the total polymer) may range from about 10 to about 95%, preferably 20 to 80%, and most preferably 30 to 70%.

"B" Component—General

The B component of this invention is an isocyanate-reactive composition which comprises at least one imino-functional compound capable of reacting directly with aromatic isocyanates (i.e. without prior cleavage of the C=N bond to form a monomeric byproduct), present as a softblock component and/or as a chain extender If an imino-functional compound is present as a chain extender, it will in general be an imino-functional compound having a molecular weight less than 1500, preferably less than 600. If an imino-functional compound is to be used in the softblock (or rubbery phase), it will in general be an imino-functional aliphatic polyether resin with a molecular weight of at least 1500, preferably 2000 to 8000, and a number-averaged functionality of imino (C=N) groups at least 1.1, preferably from about 2 to about 4.

Many types of imino-functional compounds are useful in this invention, including (but not limited to) those listed in Table A, following:

TABLE A

| Structure | TYPE |
|---|---|
| $P-R^5-C(R^6)=N-R^7$ | Simple imine |
| $P-R^5-O-C(R^6)=N-R^7$ | Imino ester |
| $P-Ar-O-C(R^6)=N-R^7$ | Imino ester (aromatic) |
| $P-R^5-N=C(R^6)(R^7)$ | Simple imine |
| $P-R^5-NR^6-C(R^7)=N-R^8$ | Amidine |
| $P-R^5-N=C(R^6)(Ar')$ | Simple imine (aromatic) |
| $P-R^5-NR^6-C(R^7)=N-Ar'$ | Amidine (aromatic) |
| $P-R^5-C(OR^7)=N-R^6$ | Imino ester (aliphatic) |
| $P-R^5-C(OAr')=N-R^6$ | Imino ester (aromatic) |
| $P-R^5-NH-C(NHR^6)=NR^6$ | Guanidine |
| $P-R^5-NR^7-C(NR_2^8)=NR^8$ | Guanidine |
| $P-R^5-NH-C(NHAr')=NAr'$ | Guanidine (aromatic) |
| $P-R^5-O-C(NHR^6)=N-R^6$ | Isourea |
| $P-R^5-O-C(NH_2)=N-R^7$ | Isourea | wherein:

$R^5$ and Ar are divalent aliphatic and aromatic organic linking groups, respectively:

P represents a polyether or hydrocarbon chain or radical, to which said imino (C=N) functional group is attached as indicated by the drawings.

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R_5$ may in particular be propylene, Ar methoxyphenylene, $R_6$ propyl, $R_7$ propyl, $R_8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy N,N-dialkylamino etc.

The preparation of these imino functional groups in both cyclic and acyclic forms is well known in the literature.

Isoureas are generally prepared by the reaction of an alcohol with a carbodiimide in the presence of a suitable catalyst. The alcohol component may be aliphatic, as described in E. Schmidt, F. Moosmuller, Lieb. Ann. 597, 235, (1956), or aromatic as in E. Vowinkel, Chem. Ber., 96, 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above, Alternatively alkylguanidines may be prepared by the reaction of an alkylamine salt with dicyandiamide as in E. A. Werner, J. Bell, J. Chem. Soc., 121, 1790, (1922). In yet another method s-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates.

The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3,630,996 to D. Tomalia, U.S. Pat. No. 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous tetrahydropyrimidines can be achieved in a similar manner by the use of 1,3-propanediamine as the diamine component. Specific methods are described in "The Chemistry of Heterocyclic Compounds: The Pyrimidines, Supplement I", Ed. A. Weissberger and E. C. Taylor, author D. J. Brown, Interscience Publishers, New York, 1953.

The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

"B" Component—Chain Extenders

Component (B)(i) useful herein is in general a chain extender. Preferred chain extenders include aromatic polyamines, imino-functional aliphatic or aromatic compounds having a molecular weight less than 1500, and mixtures thereof.

Aromatic polyamines useful as chain extenders in this invention have a number-averaged functionality of aromatically bound primary and/or secondary isocyanate reactive amine groups of from about 1.8 to about 3.0, preferably from 1.9 to 2.2, and a number averaged molecular weight which ranges from about 100 to about 400, preferably between 122 and 300. At least about 50 mole percent, preferably at least 80 mole percent, of the species comprising said polyamine are diamines. Preferably, at least about 95 mole % of amine groups, whether primary or secondary, are aromatically bound.

Examples of suitable aromatic polyamines include 3,5-diethyl-2,4-toluenediamine; 3,5-diethyl-2,6-toluenediamine; DETDA which is a mixture of about 80 percent by weight 3,5-diethyl-2,4-toluenediamine and about 20 percent by weight 3,5-diethyl-2,6-toluenediamine; 1,3,5-triethyl-2,6-diaminobenzene; 2,4-diaminotoluene; 2,6-diaminotoluene; 2,4'-diaminodiphenylmethane; 4,4'-diamino-diphenylmethane; 3,3'-dimethyl-5,5'-diethyl-4,4'-diaminodiphenylmethane;

3,3′,5,5′-tetraisopropyl-4,4′-diamino diphenyl-methane polyphenyl-polymethylene polyamines; and the like.

It is also possible to employ, in component B(i), in addition to or in place of the aromatic polyamines noted above, between 0 and 100% by weight, based on the total weight of B(i), of low molecular weight imino-functional species having a molecular weight less than 1500 wherein each such imino-functional species contains at least one imino unit per molecule. Preferably such imino-functional species have a number-averaged molecular weight less than 600, a number-averaged functionality of imino units between about 1.2 and about 2.5, wherein each imino unit is bonded to aliphatic and/or aromatic groups X, Y and Z. Examples of preferred compounds are aliphatic polyether resins terminated with aliphatic imine groups which can be made in facile manner by reacting a commercially available low molecular weight amine-terminated polyether resin such as JEFFAMINE® D-400 or JEFFAMINE® D-230 with an aldehyde or ketone to form, respectively, the corresponding aldimine or ketimine. Other examples include simple bis-ketimines or bis-aldimines of 1,6-hexamethylene diamine, isophorone diamine, menthane diamine, and the like; bis-oxazolines, bis-thiazolines, or bis-imidazolines derived from adiponitrile or adipic acid, etc.

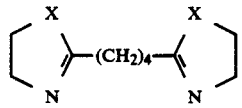

where X is O, S, NH, N—R, or N—Ar R is a monovalent aliphatic organic group of 1 to 10 carbons and Ar is an aromatic organic group of 6 to 18 carbons.

Aliphatic low molecular weight polyamine compositions may also be employed, in minor amounts not exceeding 40% by weight based upon the total weight of ingredients B(i)+B(ii), preferably less than 20%, more preferably less than 10%, and most preferably less than 1%, as an optional chain extender in stream (B). Useful aliphatic amines contain acyclic, linear or branched chains of atoms between reactive (primary and/or secondary) amine groups. These amine groups (by definition) are bonded directly, via the amine nitrogen atom, to aliphatic carbon atoms of the connecting structure. The number-averaged molecular weight of the aliphatic polyamine (or mixture of aliphatic polyamines) used in this invention is less than about 1500, preferably between 200 and 450. The number averaged isocyanate-reactive amine functionality is between 1 and 3, preferably between 2 and 2.3. The aliphatic polyamine composition should preferably be at least 50 mole percent, preferably at least 70 mole percent, diamines.

It is preferred that the aliphatic amine composition be substantially free of individual (reactive amine-containing) molecular species of molecular weight less than 170. If molecular amine species of molecular weight lower than 170 are present, they should constitute less than 20% by weight of the total aliphatic amine composition, and less than 5% of the total polyurea composition (by weight, relative to the total weight of reactive components).

It is preferred that a majority of any primary aliphatic amine groups within the aliphatic amine composition, most preferably greater than 80% of these primary amine groups, are bonded directly (via the amine nitrogen atom) to secondary and/or tertiary carbon atoms.

Examples of suitable aliphatic polyamines include the amine-terminated polyethers such as those represented below:

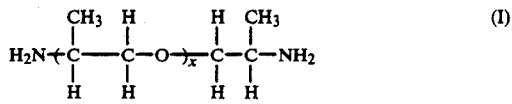

wherein x has an average value between 2 and about 6.

Polyether diamines such as Formula I, above, may be used as mixtures with higher functionality polyether polyamines such as Formula II (below), provided that the mixture meets the requirements of number averaged amine functionality and molecular weight described previously:

$$CH_3-CH_2-C-CH_2(O-CH_2-CH(CH_3))_zNH_2)_3 \quad (II)$$

wherein z has an average value between about 1 and about 2.

"B" Component—Higher Molecular Weight Softblock Resin

The preferred imine-terminated polyethers used as component (B)(ii) herein can be made by reacting an aldehyde or ketone with an amine-terminated polyether. The aldehyde- or ketone-derived product is an irreversibly-formed imine which (along with the chain extender and the polyisocyanate) is reacted into the polyurea such that the polyurea contains urea linkages having substituted urea nitrogen atoms along the polymer backbone. Suitable amine-terminated polyethers are available commercially under the registered trademark JEFFAMINE from Texaco and include JEFFAMINE D-4000, a 4000 molecular weight primary amine terminated polypropylene oxide diamine; JEFFAMINE D-2000, a 2000 molecular weight primary amine terminated polypropylene oxide diamine; JEFFAMINE T-5000, a 5000 molecular weight primary amine terminated polypropylene oxide triamine; JEFFAMINE T-3000, a 3000 molecular weight primary amine terminated polypropylene oxide triamine; JEFFAMINE ED-2000, a 2000 molecular weight primary amine terminated polyoxypropylene polyoxyethylene copolymer diamine.

Another class of suitable aliphatic amine-terminated polyethers includes the following:

$$(H_2N-CH_2CH_2CH_2-O)_xR^9$$

wherein $R^9$ is an organic polyfunctional structure containing aliphatic ether linkages (for example, polyoxypropylene chains). The size of $R^9$ is such that the molecular weight of the amine-terminated polyether resin is 1500 or higher (to a maximum of about 10,000). The functionality of $R^9$, (i.e. x), is preferably 2 or 3. Of course, mixtures of different species may be used if desired. Structures of the type shown immediately above may, for example, be made by cyanoethylation of polyether polyols (with acrylonitrile, or the like) and subsequent reduction (i.e. hydrogenation) of the nitrile end-groups to free primary aliphatic amines.

The polyether based resins used to prepare component B(ii) may also contain groups other than ether linkages. For example, amide linkages, thoiether linkages, imide linkages, siloxane linkages, and so forth, provided that these are chemically inert towards the aliphatic imine end groups or other imino groups used.

Suitable aldehydes for making the preferred imine-terminated aliphatic polyethers have the formula

R—CHO and suitable ketones have the formula $$R^1-\overset{O}{\underset{\|}{C}}-R^2$$

In the above R, $R^1$ and $R^2$ can be saturated aliphatic groups having 1–10 aliphatic carbon atoms and may contain aromatic unsaturation. In each case it is preferred that the carbon atom alpha to the carbonyl group in an aldehyde, and at least one carbon atom alpha to the carbonyl group in a ketone, be saturated. It is more preferred that both the carbon atoms alpha to the ketone carbonyl group be saturated. By "saturated", it is meant that the carbon atoms in question are bonded each directly to 4 atoms. At least one of the R groups adjacent to the carbonyl preferably contains at least one proton adjacent to the carbonyl group (for both aldehydes and ketones).

Suitable aldehydes include, for example, formaldehyde, acetaldehyde, propionaldehyde, n-butyraldehyde, isobutyraldehyde heptadehyde, α-methylvaleraldehyde, β-methylvaleraldehyde, caproaldehyde, isocaproaldehyde, cyclohexyl aldehyde, mixtures of these, and the like.

Suitable ketones include acetone, methyl ethyl ketone, methyl n-propyl ketone, diethyl ketone, methyl isopropyl ketone, benzyl methyl ketone, cyclohexanone, mixtures of these, and the like.

Suitable imine-terminated polyethers may also be prepared starting with the analogous polyether polyols, i.e. the hydroxyl-terminated analogous of the above amine-terminated polyethers. The hydroxyl-terminated polyethers can be oxidized to the ketone- or aldehyde-terminated species. The ketones can then be reacted with an aliphatic amine having one primary amine group. The polyamine can have 1–20 carbon atoms, preferably 1–10 carbon atoms. Simple aliphatic primary amines having 1–8 carbon atoms are most preferred, including methylamine, ethylamine, propylamine, n-butylamine, isobutylamine, cyclo hexylamine and hexylamine.

The reaction to form the imine-terminated polyether is facile, but it is important when making simple imines to remove substantially all water from the imine-terminated product and maintain (e.g. store) the product under anhydrous conditions. The reaction is conducted by combining the amine-terminated species with the carbonyl-containing species and heating until the imine-forming reaction is complete, typically 20 minutes to several hours, while providing for removal of the $H_2O$ formed during the reaction (i.e. by vacuum). If the amine-containing species is the amine-terminated polyether, the reaction is conducted using excess aldehyde and/or ketone. If a high-molecular weight polyether is the carbonyl-containing component, then an excess of the primary amine is preferably used, in order to insure imine formation.

Excess unconsumed volatile reactant (aldehyde or ketone or simple amine) is stripped from the product, whereby water formed during the reaction is also stripped so that the product is maintained anhydrous. With some volatile compounds such as acetone, it may be necessary to add a solvent such as toluene so that an azeotropic distillation can be effected or so that the boiling point approaches or exceeds that of water.

Many imino-functional compounds other than simple imines (e.g. oxazolines, guanidines, imidazolines, oxazines, imidines, diazines) are not moisture-sensitive and the presence of water during formation, processing, or storage of these imino groups has substantially no effect on their reaction.

If the reagent used in excess during the imine-forming reaction cannot be conveniently removed from the system after the reaction (i.e. by vacuum distillation, or some other separation technique), then the extent of the excess employed should be such that the amount of this unreacted material which is left in the imine-terminated polyether resin does not exceed about 5% by weight of the total resin, preferably not more than 2%, and most preferably less than 1%.

The aliphatic polyether product, imine-terminated as described above, preferably has a number-averaged imine functionality of from about 1.6 to about 3, and the imine groups comprise at least 50 mole percent, preferably at least 70 mole percent, of isocyanate-reactive functional groups present therein.

In a preferred embodiment, substantially all of the groups bonded to the polyether imine nitrogen or imine carbon are aliphatic, preferably saturated aliphatic. It is further preferred that the number-averaged molecular weight of the imine-terminated polyether softblock be between 2000 and 8000, and that the polyether be substantially free of components having a molecular weight less than about 1500. It is further preferred that at least 70 mole percent of the imine-terminated molecules comprising the polyether be di-imines and/or tri-imines.

In addition to the imino-functional polyethers described above, the reaction system stream (B) may also contain supplemental higher molecular weight isocyanate-reactive hydrogen-containing material. A preferred group of active hydrogen-containing materials useful as optional softblock resins have an average molecular weight of at least 1500, preferably at least 2000 up to about 100,000, an average active hydrogen group functionality from 2 to 6, preferably from 2 to 3, active hydrogen-containing groups wherein at least 70 percent, preferably at least 85 percent, of the groups are primary and/or secondary aliphatic and/or aromatic amine groups. The amount of these supplemental high-molecular-weight isocyanate-reactive materials in component B should be less than 50% by weight of the amount of component B(ii), preferably less than 25%, and most preferably less than 10%. The ratio of the number of active hydrogen containing groups in this supplemental high-molecular-weight resin to the number of imino groups in component B(ii) is less than 0.5, preferably less than 0.25, and most preferably less than 0.1:1.

Examples of suitable supplemental high molecular weight active hydrogen-containing materials include amine terminated polyethers, amine terminated organopolysiloxanes, amine terminated polymers with hydrocarbon main chain, amine terminated polyamides, and the like. Suitable amine terminated polyethers have a molecular weight of about 2000 to about 10,000, and are made from an appropriate initiator such as glycerol, ethylene glycol or trimethylolpropane, to which lower alkylene oxides such as ethylene oxide, propylene oxide, butylene oxide or mixtures thereof are added. The resulting hydroxyl terminated polyol is then aminated. When two or more oxides are used, they may be present as random mixtures or as blocks of one or the other polyether. Normally, the amination step does not completely replace all of the hydroxyl groups. For use in the invention, compounds having at least 70 percent of the hydroxyl groups converted to primary and/or secondary amine groups are preferred and those having at least 85 percent are most preferred. Amination of the polyol may be accomplished by a large number of prior art methods, for example, by reductive amination or by cyanoethylation followed by hydrogenation of the nitrile end groups.

If it is desired to reductively aminate a polyethylene oxide polyol, it is desirable to cap the hydroxyl terminated polyol with a small amount of higher alkylene oxide so that the terminal hydroxyl groups are secondary hydroxyl groups. The polyols so prepared are then reductively aminated by prior art techniques, for example, as disclosed in U.S. Pat. No. 3,654,370, incorporated herein by reference.

A single high molecular weight amine terminated polyether may be used. Also, mixtures of amine terminated polyethers such as mixtures of di- and tri-functional materials and/or different molecular weights or different chemical composition materials may be used.

Suitable amine terminated organopoly siloxanes include, for example, those represented by the formula

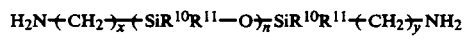

where $R^{10}$ and $R^{11}$ independently are aryl groups or alkyl groups containing from 1 to 8 carbon atoms including methyl, ethyl, propyl, butyl, phenyl, pentyl, hexyl, octyl, or branched chains thereof, cyclobutyl, cyclopentyl, cyclohexyl, cycloheptyl, and cyclooctyl.

$R^{10}$ and $R^{11}$ may be the same or different, x and y have values from about 3 to about 10, and x and y may be the same or different, and n is selected such that the formula has a molecular weight of at least about 1500. A specific example of such a polysiloxane material is PS-513, which is commercially available from Petrarch Systems Inc. This is a linear polydimethyl siloxane fluid which contains terminal aminopropyl groups. The material is a diprimary diamine having a molecular weight of about 28,000.

Suitable amine terminated reactive liquid polymers having hydrocarbon main chains are disclosed in U.S. Pat. No. 4,535,147, which is incorporated by reference. An example of such an amine terminated reactive liquid polymer is represented by the formula Such reactive liquid polymers are commercially available from B. F. Goodrich as HYCAR ATBN 1300×16 and HYCAR ATBN 1300×21.

Stream (B) may further comprise hydroxyl-containing species such as one or a mixture of polyols which have an average molecular weight of at least 1500 and an average hydroxyl functionality from 2 to 8. The total of hydroxyl groups amount to less than 30 percent, equivalents basis, of the aliphatic imine groups in component B(ii), preferably less than 15 percent. Examples of suitable high molecular weight polyols include, for example, hydroxyl terminated polyoxpropylene; polyoxypropylene-polyoxyethylene copolymers; polyoxypropylene-polyoxybutylene copolymers; and polytetramethylene oxide diols. The amount, by weight, of these polyols should not exceed 50% of the weight of the imine-terminated polyether resin (B-ii), and preferably should be less than 25%, most preferably less than 10%, of the weight of B(ii).

Additives

The reaction systems of the present invention can further include additives such as internal mold release agents, catalysts, surfactants, blowing agents, fillers (which may be reinforcements), plasticizers, fire retardants, coupling agents, and the like.

Suitable internal mold release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mold release additive is Goldschmidt-412T (available from Goldschmidt Silicones). The amount of internal mold release agent used can be from about 0.001 to about 5.0 percent by weight of the total reactants (i.e. total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines which include, for example, triethylamine; heterocyclic amines such as N-alkylmorpholines which include, for example, N-methylmorpholine, N-ethylmorpholine; 2,2'-bis(dimethylamino)diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and or-

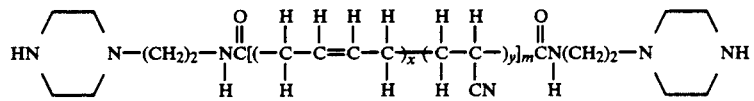

where
x may be 1-10, and
y may be 0-5, and
m is selected such that the formula has a molecular weight of at least 1500.

ganotin catalysts are frequently used in the art. Isocyanurate catalysts, such as alkali and/or alkaline earth metal salts of carboxylic acids, may also be added to the formulations of the invention.

Another group of catalysts, which are more specific for the isocyanate-amine reaction, and particularly for the reaction of isocyanates with aliphatic imines, include carboxylic acids and precursors thereof (such as acid anhydrides). Specific examples of carboxylic acid catalysts include oleic acid, 1,12-dodecanedioic acid, isophthalic acid, and the like. These types of catalysts are described in U.S. Pat. Nos. 4,499,254; 4,487,908; and 4,487,912 and in U.S. Pat. No. 3,789,045 (for the imine-isocyanate rxn.)

It is often preferable to use a catalyst for the imine-isocyanate reaction in the polyurea formulations of this invention. The use of catalysts is, however, not essential. When catalysts are used, it is preferred to incorporate them into the isocyanate stream (A) and hence to isolate them from component B, until after the impingement mixing step. Suitable catalysts, or latent catalysts, which may be incorporated into the isocyanate stream include carboxylic acids. Particluarly preferred are fatty acids such as oleic acid. Organic carboxylic acid anhydrides are preferred as latent catalysts for use in the A-stream, for example, cis-1,2-cyclohexane-dicarboxylic acid anhydride (1).

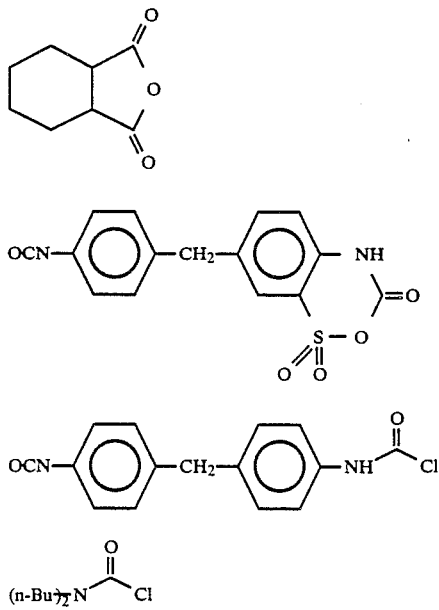

Other potential catalysts, or catalyst precursors, for use in the isocyanate include organic acid halides, such as butyryl chloride or benzoyl chloride sulfonic acid anhydrides such as 2 (formed from the reaction of MDI with sulfur trioxide); Carbamoyl halides such as 3 (formed from reaction of MDI with hydrochloric acid), or 4. The catalysts, and/or catlyst precursors, should be used at concentrations of 5% (w/w) or less (relative to total polymer weight), preferably 2% or less, and most preferably less than 1%.

Catalysts may be useful as processing aids in some formulations.

Suitable surfactants include, for example, sodium salts of castor oil sulfonates alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gasses such as air, $CO_2$, $N_2O$, or nitrogen, and low boiling halogenated hydrocarbons such as methylene chloride and trichloromonofluoromethane. The amount of blowing agent used is less than about 4 percent by weight of the total reactants.

Suitable fillers include fiberglass reinforcement fibers, particularly those having lengths of from about 1/16 inch (0.16 cm) to about ½ inch (1.27 cm) and milled glass fibers having a length of 1/16 inch (0.16 cm), ⅛ inch (0.32 cm) or ¼ inch (0.64 cm) and the like. Shorter fibers are always preferred for ease of processing when they are incorporated as part of the "A" or "B" component streams. Other particularly suitable fillers are mica, fumed silica, flake glass, Wollastonite, calcium carbonate, carbon black, and the like.

Process

The reaction systems and polymers of this invention are mixing activated systems which are processed by the reaction molding (RIM) process in a RIM machine. The invention provides improved control (improved flow characteristics and improved mixing quality) in fast reacting, fast gelling systems. Accordingly, the invention is directed to reaction systems having gel times, under the conditions of processing, less than about 1 minute, preferably less than 30 seconds, more preferably less than 20 seconds, and most preferably less than 10 seconds. The reaction systems of this invention can be used to make polyureas which are shapable by RIM into useful articles such as automobile fascia and panels.

RIM machines are well known in the art and include those supplied by Admiral Equipment Corp., Akron, Ohio by Cincinnati Milacron Corp., Cincinnati, Ohio, by Battenfeld Co., Mienerzhagen, West Germany and by Kraus Maffei GmbH, West Germany.

In the RIM process, the polyisocyanate composition is referred to as the "A" Component, and the "B" Component refers to the composition comprising the polyamine and imine-terminated reagents, components B(i) and B(ii), which component may optionally include other isocyanate-reactive material. The reagents may be blended in a suitable container and agitated at a temperature from about 20° C. to about 100° C. for a time between five and sixty minutes using a high sheer blade such as a Cowles blade, at a rotational speed of 50 to 2500 rpm. It is preferred to mix and process the ingredients of component (B) at or near ambient (20° C.) temperature. Ingredients B(i) and B(ii) should preferably not be heated (together) once mixed.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catlyst for the imine-isocyanate reaction. The temperature of the "B" Component can be between about 20° C. to about 80° C., but is preferably about 20° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.10. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamines groups, ketene aminal groups, mercapto(—SH) groups and carboxylic acids, said groups being organically bound.

The "A" stream may contain up to 40% of its weight in solid fillers or reinforcements. In a preferred embodiment, the A stream contains at least 70% by weight of aromatic isocyanate species, not more than 30% by weight of fillers and/or reinforcements, and not more than 10% of other optional additives.

The impingement mixed blend of "A"/"B" streams is injected into a mold at a velocity from about 0.3 lb./sec. to about 70 lb./sec., preferably 5 to 20 lb./sec. The mold is heated to a temperature from about 20° C. to 250° C. Suitable molds are made of metal such as aluminum or steel, although other materials can be used if they can withstand the processing conditions and wear. Usually an external mold release agent is applied before the first molding. These are usually soaps or waxes which are solid at the mold temperature employed.

A molded polymer article is formed after the impingement mixture is in the mold from about 1 second to about 30 seconds, preferably 5 to 20 seconds. The mold is then opened and the molded product is removed from the mold. The molded product may be post cured by placing the product in an oven having a temperature between 50° C. and about 250° C. for a time from about one-half hour to about 3 hours.

Mold filling may be accomplished in this invention in a more facile manner due to the reaction profile of the systems disclosed herein. Generally there is an induction period of about 1 to 5 seconds, usually 1 to 3 seconds, during which the reaction between the isocyanate- and the imino-functional ingredients is flat or retarded. Following this induction period the reaction accelerates noticeably. This behavior is in sharp contrast to that of the primary aliphatic amines used in the prior art. These amines appear to begin reacting with aromatic isocyanates on contact. These reaction profiles can be visualized by means of the adiabatic temperature-rise technique, which involves dispensing reaction systems (or two or more individual ingredients) through an impingement mixing device into a insulated cup equipped with thermocouples. The temperature rise due to the reaction is then monitored, at intervals of 0.1 sec. or less, and plotted versus time. Of course, as expected, the induction periods are most clearly evident when the imino compounds are reacted neat (i.e., free of other ingredients) with the aromatic isocyanates. Further evidence of the improved flowability of the systems of the invention relative to the prior art are provided in the Examples. Molded objects can be demolded after a mold residence time of 30 seconds, often 15 seconds or less at a mold temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.10; with the proviso that, if a catalyst for the conversion of isocyanate to isocyanurate groups is present, the index may extend up to about 15.00. Examples of suitable isocyanurate catalysts include alkali metal salts of carboxylic acids, for example, potassium 2-ethylhexoate.

In addition to polyurea RIM, the flow and property advantages and the resulting improvements in processability provided by the reaction systems of the invention make then well suited for use in mat reinforced structure/RIM systems (SRIM). In these systems, a continuous mat of reinforcing fibers is placed in the mold and the reaction system is pumped through and around this mat, thereby providing a composite with mechanical reinforcement. The flow requirements for SRIM can therefore be quite demanding, however. The mats are generally made of glass fibers, but metallic fibers, aramid fibers, carbon fibers, Nylon fibers, combinations of these, and the like may be used. The individual fibers can be quite long relative to reinforcements which can be incorporated via individual component monomer streams, comparable to or longer than the molded part itself when fully extended. The polyurea systems of the invention are well suited to the demanding process requirements of SRIM.

The invention is further disclosed and described by means of the following examples which are not to be taken as limiting. In the Examples, flexural modules ($E_{flex}$) was determined by ASTM D790. Shore D Hardness was determined by ASTM D2246. Heat Sag was determined by ASTM D3769-85. CLTE was determined by ASTM D969. Tensile strength was determined by ASTM D638. Impact falling weight (Impact) was determined by ASTM D3029-84.

The following glossary of materials is included to identify the reaction components in the Examples.

| GLOSSARY | |
|---|---|
| Pure MDI | Pure 4,4'-diphenylmethanediisocyanate having an average isocyanate equivalent weight of 125; commercially available from ICI Americas Inc. as Rubinate 44. This product contains less than 2% of the 2,4'-MDI isomer. |
| LF-168 | Modified 4,4'-diphenylmethanediisocyanate having an average isocyanate equivalent weight of about 143; commercially available from ICI Americas Inc. as Rubinate LF-168. |
| LF-209 | A prepolymer based on a modified MDI and a high Mw polyether. The prepolymer has a |

GLOSSARY

| | |
|---|---|
| | free isocyanate (—NCO) content of 21.5 percent. Commercially available from ICI Americas Inc. as Rubinate LF-209. |
| ISOCYANATE-24 | An 80:20 mixture of 4,4'-diphenylmethane-diisocyanate and 2,4'-diphenylmethane-diisocyanate. Available commercially from ICI Americas Inc. |
| XI-208 | A modified diphenylmethane diisocyanate variant, having an average isocyanate equivalent weight of about 135: available as development product XI 208 from ICI Americas Inc. |
| VM-20 | Modified pure MDI having an isocyanate content of 29.1% by weight: Commercially available from Imperial Chemical Industries PLC as Suprasec VM 20. |
| LHT-34 | A polyoxypropylene triol (OH-number 34), commercially available from Union Carbide Corporation. |
| T-3275 | A polyoxyethylene capped polyoxypropylene triol having a hydroxyl number of 32. Available commercially from Imperial Chemical Industries PLC as Daltocel T 32-75. |
| PPG 2000 | A polyoxypropylene diol having a hydroxyl number of 56. Available commercially from Imperial Chemical Industries PLC. |
| D-2000 | A 2000 molecular weight polyoxypropylene diamine, which is commercially available from Texaco Chemical Corporation under the registered trademark JEFFAMINE. |
| D 400 | A 400 molecular weight polyoxypropylene diamine commercially available as JEFFAMINE D-400 from Texaco Chemical Corporation. |
| E2103 | A polyoxyethylene capped polyoxpropylene diol of about 2000 molecular weight, commercially available from Texaco Chemical Corporation. |
| DETDA | A mixture consisting of about 80% by weight 3,5-diethyl-2,4-diaminotoluene and 20% 3,5-diethyl-2,6-diaminotoluene, commercially available from Ethyl Corporation. |
| T-5000 | A polyoxypropylene triamine, commercially available from Texaco Chemical Corporation as JEFFAMINE T-5000. The molecular weight is 5000. |
| D-400 C.H. | The cyclohexanone diimine of D-400. |
| T-5000 MEK | The methyl ethyl ketone tri-imine of T-5000. |
| T-5000 Acetone | The acetone tri-imine of T-5000. |

Examples 1-9 are polyurea formulations according to the invention which were processed on an Admiral 2000 HP RIM Machine, a machine well known to those skilled in the art. The compositions of each side ("A" and "B") used to make the polyureas are shown in Table 1. Table 2 shows the processing parameters used to make each of the polyureas of Examples 1-9. Table 3 lists physical properties for the polyureas of Examples 1-9.

In each of Tables 1-3, C-1 denotes a control formulation not according to the invention. The amounts of components variously set forth for the "A" and "B" components in Tables 1-3 are in weight percent based on the total of reactive ingredients used to make the polymer, unless otherwise noted. Capital letters in parentheses, for example in Table 2, designate different molding conditions (such as mold temperature) for the same (identical) compositions.

TABLE I

Polyurea Formulations; Admiral Machine

| Example | 1 | 2 | 3 | 4 | 5 | 6 | 7 | 8 | 9 | C-1 |
|---|---|---|---|---|---|---|---|---|---|---|
| Hardblock (%) | 45.00 | 45.00 | 45.00 | 45.00 | 45.00 | 45.00 | 45.00 | 45.00 | 45.00 | 45.00 |
| A-comp: | | | | | | | | | | |
| Pure MDI | — | 21.60 | 21.60 | — | — | 9.17 | 5.19 | 5.19 | — | — |
| LF-168 | — | 7.20 | 7.20 | — | — | 3.05 | 1.73 | 1.73 | — | — |
| LF-209 | — | — | — | — | — | — | — | — | — | — |
| Isocyanate-24 | 24.45 | — | — | 21.31 | 21.31 | 12.24 | 16.17 | 16.17 | 21.31 | 21.31 |
| XI-208 | 4.31 | — | — | 9.13 | 9.13 | 5.25 | 6.93 | 6.93 | 9.13 | 9.13 |
| LHT-34 | — | 46.08 | 46.08 | — | — | 19.56 | 11.08 | 11.08 | — | — |
| D-2000 | — | — | — | 24.91 | 24.91 | 14.31 | 18.90 | 18.90 | 24.91 | 24.91 |
| E-2103 | 9.59 | — | — | — | — | — | — | — | — | — |
| Oleic Acid+ | — | — | 1.00 | — | 1.00 | 1.00 | 1.00 | 1.00 | 1.00 | 1.00 |
| B-comp: | | | | | | | | | | |
| DETDA | 16.22 | 16.17 | 16.17 | 14.56 | 14.56 | 15.29 | 15.00 | 15.00 | 14.56 | 14.56 |
| T-5000 MEK | 45.41 | 8.95 | 8.95 | 30.09 | 30.09 | 21.13 | 25.00 | — | — | — |
| T-5000 Acetone | — | — | — | — | — | — | — | 25.00 | 30.09 | — |
| T-5000 | — | — | — | — | — | — | — | — | — | 30.09 |

+Amounts are parts by weight (pbw) based on 100 pbw polymer

TABLE 2

Polyurea Systems; Processing Data

| Example | 1 | 2 | 3 | 4 | 5 |
|---|---|---|---|---|---|
| Hardblock (%) | 45.00 | 45.00 | 45.00 | 45.00 | 45.00 |
| Mold Temp (°C.) | 149 | 149 | 149 | 149 | 149(A) |
| | | | | | 121(B) |
| | | | | | 93(C) |
| | | | | | 82(D) |
| | | | | | 71(E) |
| A-comp temp(°C.) | 55 | 40 | 40 | 45 | 45 |
| B-comp temp(°C.) | 30 | 30 | 30 | 21 | 25 |
| +Mix pressures, psi | 2500 | 2500 | 2500 | 2500 | 2500 |
| Orifice A, mm | 4.5 | 4.5 | 4.5 | 4.5 | 4.5 |
| Orifice B, mm | 4.5 | 4.5 | 4.5 | 4.5 | 4.5 |
| Shot time(sec) | 0.33 | 0.34 | 0.34 | 0.32 | 0.32 |
| Total output(g/sec) | 999 | 999 | 999 | 999 | 999 |
| Demold Time(sec) | 30 | 30 | 30 | 30 | 30 |

TABLE 2-continued

Polyurea Systems; Processing Data

| | | | | | |
|---|---|---|---|---|---|
| Post cure conditions (hours, °C.) | 1h,163 | 1h,163 | 1h,163 | 1h,163 | 1h,163 |
| Appearance at demold | Tough Opaque Soft | Tough Semi-Opaque | Tough Transparent | Opaque white tough | Opaque white tough at 82° or above++ brittle below |
| Appearance after Postucure | same | same | same | tough | tough |
| Flow Restrictors | 2 | 2 | 2 | 2 | 2 |

| Example | 6 | 7 | 8 | 9 | C-1 |
|---|---|---|---|---|---|
| Hardblock (%) | 45.00 | 45.00 | 45.00 | 45.00 | 45.00 |
| Mold Temp (°C.) | 149(A) 71(B) 60(C) | 149 | 149(A) 60(B) | 149(A) 60(B-D) | 149(A) 121(B) 93(C) 82(D) 71(E) 60(F-H) |
| A-comp temp(°C.) | 45 | 45 | 45 | 45 | 45 |
| B-comp temp(°C.) | 25 | 25 | 25 | 25 | 25 |
| +Mix pressures, psi | 2500 | 2500 | 2500 | 2500 | 2500 |
| Orifice A, mm | 4.5 | 4.5 | 4.5 | 4.5 | 4.5 |
| Orifice B, mm | 4.5 | 4.5 | 4.5 | 4.5 | 4.5 |
| Shot time(sec) | 0.32 | 0.33 | 0.33 | 0.32(A,B) | 0.32(A-F) 0.64(G) 1.28(H) |
| Total output(g/sec) | 999 | 999 | 999 | 999(A,B) 500(C) 250(D) | 999(A-F) 500(G) 250(H) |
| Demold Time(sec) | 30(A,C) 15(B) | 30 | 30 15(B) | 30(A,C,D) | 30 |
| Post cure conditions (hours, °C.) | 1h,163 | 1h,163 | 1h,163 | 1h,163 | 1h,163 |
| Appearance at demold | almost clear, Tough at 71° or above++ brittle at 60° | Tough++ Opaque | Tough at all temps++ clear | Tough; all conditions++ D-did not fill clear | clear tough at all mold temp++ H-did not fill |
| Appearance after Postucure | tough | tough | tough | tough | tough |
| Flow Restrictors | 2 | 2 | 2 | 2 | 2 |

+Both streams
++(Mold temp.) Showed no cracking when clamped (on demold) into vise, at or above the molding temperature indicated.

TABLE 3

Polyurea Properties

| Example | 2 | 3 | 4 | 5(A) | 5(D) | 6 |
|---|---|---|---|---|---|---|
| Hardblock (%) | 45.00 | 45.00 | 45.00 | 45.00 | 45.00 | 45.00 |
| Flex. Mod. ($10^3$ psi) | | | | | | |
| 73° F. | 37.3 ± 0.1 | 36.6 ± 0.3 | 76.0 ± 0.2 | 68.3 ± 0.8 | 71.8 ± 0.6 | 48.6 ± 0.8 |
| −20° F. | 56.8 ± 6.0 | 61.0 ± 2.5 | 136.3 ± 2.8 | 122.1 ± 3.6 | 137.6 ± 0.9 | 83.1 ± 3.4 |
| 185° F. | 31.0 ± 0.5 | 29.4 ± 0.1 | 55.9 ± 1.1 | 52.3 ± 0.6 | 54.2 ± 0.9 | 33.4 ± 0.4 |
| Ratio (−20°/158°) | 1.83 ± 0.22 | 2.07 ± 0.09 | 2.44 ± 0.10 | 2.33 ± 0.10 | 2.54 ± 0.05 | 2.49 ± 0.13 |
| Heat Sag (1h,6"),in | | | | | | |
| 250° F. | 0.04 ± 0.01 | 0.15 ± 0.02 | — | — | — | — |
| 275° F. | 0.04 ± 0.02 | 0.11 ± 0.05 | 0.07 ± 0.01 | 0.13 ± 0.05 | 0.13 ± 0.02 | 0.20 ± 0.01 |
| 300° F. | 0.21 ± 0.02 | 0.15 ± 0.05 | — | — | — | — |
| 325° F. | 0.35 ± 0.07 | 0.40 ± 0.05 | 0.20 ± 0.00 | 0.23 ± 0.04 | 0.43 ± 0.00 | 0.37 ± 0.05 |
| 350° F. | 0.66 ± 0.03 | 0.86 ± 0.03 | — | — | — | — |
| HDT, 66 psi, °C. | 182.5 ± 2.5 | 191.0 ± 1.0 | — | — | — | — |
| 264 psi, °C. | 61.0 ± 1.0 | 60.0 ± 2.0 | 56.5 ± 1.5 | 51.5 ± 0.5 | 48.5 ± 0.5 | 44.5 ± 0.5 |
| Impact Resistance | | | | | | |
| Gardner (73° F.); J | — | — | — | — | — | — |
| Gardner (−22° F.); J | — | 18+ | — | — | — | — |
| Ultimate Elongation (%) | 166 ± 22 | 182 ± 18 | 127 ± 20 | 117 ± 11 | 137 ± 7 | 143 ± 25 |
| Tensile Strength (psi) | 4245 ± 388 | 4449 ± 295 | 4316 ± 237 | 4202 ± 211 | 4424 ± 115 | 3985 ± 347 |
| Tear Resistance (pli) | 459.6 ± 5.02 | 502.3 ± 5.93 | 344 ± 4.0 | 351 ± 6 | 347 ± 8 | 428 ± 5 |
| S.P.G.: | 1.10 ± 0.01 | 1.10 ± 0.00 | 1.11 ± 0.00 | 1.11 ± 0.00 | 1.11 ± 0.00 | 1.11 ± 0.00 |
| CLTE (in/in/°C.) × $10^{-5}$ | — | — | — | — | — | — |
| Mold Temp. (°C.) | 149 | 149 | 149 | 149 | 82 | 149 |

| Example | 7 | 8 | 9 | C-1 |
|---|---|---|---|---|
| Hardblock (%) | 45.00 | 45.00 | 45.00 | 45.00 |
| Flex. Mod. ($10^3$ psi) | | | | |
| 73° F. | 46.9 ± 1.4 | 60.6 ± 1.3 | 71.5 ± 0.3 | 53.6 ± 0.4 |
| −20° F. | 92.8 ± 1.4 | 110.5 ± ±.1 | 131.5 ± 0.8 | 111.0 ± 1.8 |
| 158° F. | 37.6 ± 1.2 | 47.2 ± 0.8 | 54.3 ± 2.4 | 41.7 ± 0.7 |

TABLE 3-continued

| Polyurea Properties | | | | |
|---|---|---|---|---|
| Ratio (−20°/158°) | 2.47 | 2.34 | 2.42 | 2.66 |
| Heat Sag (1h,6"),in | | | | |
| 250° F. | — | — | — | — |
| 275° F. | 0.17 ± 0.04 | 0.13 ± 0.01 | 0.03 ± 0.02 | 0.17 ± 0.02 |
| 300° F. | — | — | — | — |
| 325° F. | 0.72 ± 0.02 | 0.44 ± 0.02 | 0.42 ± 0.01 | 0.48 ± 0.04 |
| 350° F. | — | — | — | — |
| HDT, 66 psi, °C. | — | — | — | — |
| 264 psi, °C. | 52.0 ± 2 | 56.0 ± 0 | 57.5 ± 0.5 | 48.5 ± 3.5 |
| Impact Resistance | | | | |
| Gardner (73° F.); J | — | — | — | — |
| Gardner (−22° F.); J | — | 18.1+ | 18.1+ | 18+ |
| Ultimate Elongation (%) | 69 ± 25 | 101 ± 5 | 103 ± 5 | 159 ± 0 |
| Tensile Strength (psi) | 3174 ± 295 | 3721 ± 29 | 4045 ± 147 | 4219 ± 106 |
| Tear Resistance (pli) | 329 ± 9 | 429 ± 17 | 405 ± 6 | 498 ± 6 |
| S.P.G.: | 1.11 ± 0.00 | 1.10 ± 0.00 | 1.11 ± 0.00 | 1.12 ± 0.01 |
| CLTE (in/in/°C.) × $10^{-5}$ | — | — | — | — |
| Mold Temp. (°C.) | 149 | 60 | 60 | 60 and 149 |

+Above upper limit of test, (4 lb. weight).

Formulation C-1 is not of this invention. Example C-1 is of the prior art. This conventional polyurea formulation was included because it is exactly analogous to the formulation of Example 9; differing only in that underivatized T-5000 was used (instead of the acetone imine, as in Example 9).

The processing of formulations 9 and C-1 were carefully scrutinized (see Table 2; conditions A-D, and A-H, respectively). This was done by reducing machine output and increasing shot-time; until the mold could no longer be filled. Under the conditions of this experiment, formulation 9 (according to the invention) exhibited better flow/fill characteristics than formulation C-1 (the analogous system of the prior art). At the lowest machine output investigated in these experiments (conditions "D" for Example 9, and conditions "H" for formulation C-1;—i.e. 250 g/sec. at 60° C. mold temp.), neither system filled the mold. However, formulation 9 penetrated more than twice as far into the mold than did formulation C-1 (i.e. under the same processing conditions), before gelation prevented further flow. Moreover, the partially filled part from system 9 (D) appeared well mixed and had a smooth flow-front whereas the analogous "short shot" from system C-1 (H) was very poorly mixed (i.e. contained mix-lines, many color-inhomogeneities, and turbulence patterns), and exhibited a ragged flow front. These observations are diagnostic of poor flow characteristics for system C-1 (H).

Example 10-11 and Control Formulations C-2,C-3

These examples are intended to further demonstrate the superior processability of compositions according to the invention.

The compositions of Examples 10-11 and of control formulations C-2 and C-3 were molded into a complex automobile front fascia, including grillwork, in a RRIM 90 molding machine (available commercially from Cincinnati Milacron, Cincinnati, Ohio). Compositional data and molding conditions are set forth in Table 4, following:

TABLE 4

| Example | C-2 | C-3 | 10 | 11 |
|---|---|---|---|---|
| Hardblock (%) | 45 | 45 | 45 | 45 |
| A-Comp: | | | | |
| Isocyanate-24 | 21.31 | 21.31 | 21.31 | 21.31 |
| XI-208 | 9.13 | 9.13 | 9.13 | 9.13 |

TABLE 4-continued

| Example | C-2 | C-3 | 10 | 11 |
|---|---|---|---|---|
| D-2000 | 24.91 | 24.91 | 24.91 | 24.91 |
| Oleic Acid | 1.00 | 1.00 | 1.00 | 1.00 |
| B-Comp: | | | | |
| DETDA | 14.56 | 14.56 | 14.56 | 14.56 |
| T-5000 | 30.09 | 30.09 | | |
| T-5000 Acetone | | | 30.09 | 30.09 |
| Mold Temp (°C.) | 65.5 | 65.5 | 65.5 | 65.5 |
| A-Comp Temp (°C.) | 36 | 36 | 36 | 36 |
| B-Comp Temp (°C.) | 36 | 36 | 36 | 36 |
| Demold Time (S) | 30 | 30 | 30 | 30 |
| Inj. Rate (lb/sec.) | 8 | 7 | 7 | 6 |
| Green Strength | Good | Good | Good | Good |
| % of Fill* | 100 | 95 | 100 | 98 |

*Approximate. The part required 13.9 pounds, the shot weight used, to fill its 0.192 cubic foot volume.

Control formulations C-2 and C-3, which contained the amine-terminated polypropylene oxide triamine T-5000 but contained no imine-terminated aliphatic polyether, unacceptably formed V-shaped notches or voids in the grill work. Examples 10 and 11, which contained the imine-terminated species corresponding to the amine-terminated polypropylene oxide triamine of C-2 and C-3, formed no such voids or notches. This is indicative of superior processability of compositions according to the invention. Also, Examples 10-11 filled the mold completely or more completely at lower injection rates than C-2 or C-3, further indicating the better processability of compositions according to the invention.

EXAMPLE 12

This example illustrates the laboratory preparation of an imine-terminated polyether.

4000 g of T-5000 and 4000 g of methyl ethyl ketone were added to a 3-neck 10 liter round bottom glass reaction kettle. A condenser column was placed atop the reaction kettle on one neck, a gentle dry nitrogen flow was maintained at the top of the condenser, while through a second neck the kettle was equipped with a thermometer. Agitation of the reaction mixture with a glass stir shaft and a stir paddle made from polytetrafluoroethylene (TEFLON ®, DuPont) was implemented through the third neck and heat was applied with a heating mantle until reflux, about 80° C. Reflux was continued for one hour.

The temperature was decreased until reflux stopped, and agitation was discontinued. The reflux column was replaced with a distillation column and nitrogen flow was implemented into the reaction vessel and out through the distillation column. Agitation was restarted and sufficient heat was applied to maintain a steady distillation rate of residual methyl ethyl ketone. When distillation was complete the reaction kettle was equipped with vacuum by attaching the vacuum source (i.e. a pump) to the distillation receiver flask. The apparatus was sealed by using silicone grease to lubricate joints. Vacuum was begun gradually with gentle stirring at 80° C., the vacuum pressure being ultimately decreased to less than 1.5 torr for one hour.

The vacuum was then broken and the reaction tested for completion by infrared (IR) spectroscopy of the product. The absence of a carbonyl peak at 1710 cm$^{-1}$, indicated that residual methyl ethyl ketone had been completely removed. The absence of an amine peak at 1600–1610 cm$^{-1}$ indicated that T-5000 had reacted completely. The presence of an imine peak at 1660 cm$^{-1}$ indicated the formation of the desired T-5000 MEK. The intensity of a reference peak at 1490 cm$^{-1}$, present in both reactant and product spectrums, was used to gauge the pressure which was applied to the salt cells to achieve roughly the same thickness of each sample monitored.

EXAMPLE 13

This example illustrates the laboratory preparation of an imine-terminated polyether using a cosolvent distillation.

4500 g of T-5000, 2250 g of acetone, and 2250 g of toluene was placed in a 10 liter reaction kettle and heated with dry nitrogen flow and agitation to reflux, about 70° C., and refluxed for one hour, as described in Example 12. The reflux condenser was then replaced with a distillation column and the mixture was heated to 80° C. maximum to maintain a steady distillation rate of residual acetone and toluene. The system was then sealed and evacuated gently, ultimately reaching a vacuum of less than 1.5 torr. The temperature was gradually increased during this distillation to 130° C. to distill toluene. After one hour at 1.5 torr or less, vacuum was broken and the product was tested for completeness of reaction. The reaction was determined to be complete by IR, using the same peaks noted in Example 12, including the carbonyl peak at 1710 cm$^{-1}$ which can be used to monitor the absence of acetone as well as methyl ethyl ketone.

EXAMPLE 14

This example illustrates the synthesis of an imine-terminated polyether in production quantities.

210 lb. of T-5000 was preheated to 35°-40° C. and added to a 60 gallon reaction kettle along with 70 lb. of toluene and 70 lb. of acetone. The kettle was purged with dry nitrogen prior to adding the T-5000, toluene and acetone therein. The kettle was pre-equipped with a metal coil through which hot water or steam for warming the reaction mixture or cold water for cooling the reaction could be circulated. A dry nitrogen sparge was implemented through the reaction mixture.

Steam was circulated through the metal coil until a reaction temperature of about 65° C. was reached. At this point, external heat through a heating mantle was applied until reflux was reached, taking care to avoid foaming the mixture. Reflux was maintained for 2 hours from the start of boil up.

The reflux line was closed and distillation was effected by increasing the temperature to 125° C. About 95 lb. of water/acetone/toluene distilled over before the 125° C. set point was reached. At this point, the heat was turned off and cold water was circulated through the metal coil to cool the reaction mixture to about 75° C.

An initial vacuum stage for stripping was applied until about 25 inches of mercury vacuum was achieved. Vacuum was then lowered to about 100 mm of mercury while heating the kettle mixture to about 125° C. At this point the heat was turned off and cooling water was circulated through the metal coil to achieve a temperature of about 75° C.

The condensate receiver was drained and final vacuum stripping was initiated by implementing a vacuum of about 25 mm of mercury while reheating to about 150° C. and holding for one hour. Heat, vacuum, and nitrogen sparge were then turned off and the final T-5000 acetone product was cooled to below 35° C.

Examples 15 and 16 are comparative examples which, together with example 17, illustrate the use of low molecular weight (ca. less than M.W.=1500) imino-functional polyether resins as chain extenders.

EXAMPLE 15

A prepolymer was made by sequentially adding 25.9 parts by weight of T-3275 and 24.9 parts by weight of D-2000 to 49.2 parts by weight of ISOCYANATE-24. The prepolymer, which had an isocyanate content of 13.53 wt. %, was employed as the "A" component and reacted with a "B" component having the following composition:

| | |
|---|---|
| catalyst and internal mold release agent | 2.5 pbw |
| D-400 | 50 pbw |
| DETDA | 50 pbw |

The formulation was processed on a Battenfeld SHK 65 RIM machine wherein the "A" component was maintained at 40° C. and the "B" component was maintained at 40° C. before being impingement mixed and injected into a mold which had been preheated to 65° C. The hardblock content of the processed formulation was 62.4 wt. %.

EXAMPLE 16

The same formulation was processed as in Example 15, except that the prepolymer "A" component was formulated additionally to contain 10 parts by weight of VM 20. The prepolymer was thus formulated by reacting the following (in pbw).

| | |
|---|---|
| T-3275 | 25.9 |
| D-2000 | 24.9 |
| ISOCYANATE-24 | 49.2 |
| VM-20 | 10 |

The isocyanate content of the prepolymer was 14.95 wt. %. The hardblock content of the processed formulation (i.e. the finished polymer) was 67.7%.

EXAMPLE 17

The same formulation was processed as in Example 16, except that D-400 in the "B" component was replaced with an equal amount of D-400 C.H. The "B" component thus contained (pbw)

| | |
|---|---|
| catalyst and internal mold release agent | 2.5 |
| D-400 C.H. | 50 |
| DETDA | 50 |

The hardblock content of the processed formulation was 67.7%.

It was noted that the formulation of Example 17 which employed an imino-functional chain extender and which is within the scope of this invention, gave much better flow than the formulations of Examples 15 and 16 which employed the corresponding aliphatic amine and are not within the invention. More specifically, the gel time was well less than one second for the formulations of Examples 15 and 16 but was 1.6 seconds for Example 17. This demonstrates superior flow provided by using an imino-functional chain extender.

Table 5 gives the physical properties for test plaques molded from the formulations of Examples 15–17. The test plaques were one foot squares having a thickness of 3 mm.

TABLE 5

| Example | 15 | 16 | 17 |
|---|---|---|---|
| $E_{flex}$ (MPa) | 532 | 800 | 912 |
| Density (Kg/M$^3$) | 1072 | 1110 | 1101 |
| Shore D Hardness | 66 | 69 | 75 |
| Tensile Str. (KPa) | 29407 | 27850 | 29072 |
| Elongation (%) | 130 | 60 | 17 |
| Heat Sag (160° C.) | | | |
| 30" | 11.5 | 4.5 | 6.5 |
| 60" | 20.5 | 9.0 | 14.5 |
| CLTE* ($\alpha \cdot 10^6$/°C.) | 130 | 126 | 135 |
| Impact (joules) | | | |
| Room Temp. | 50 | 38 | 39 |
| −20° C. | 41 | 15 | 21 |

*CLTE = Coefficient of Linear Thermal Expansion

EXAMPLE 18

This example illustrates the synthesis of an imino-functional softblock resin wherein the imino functionalities are guanidine groups.

7500 g of T-5000 (1.5 moles) and 770.6 g of N,N'-dicyclohexylcarbodiimide (hereinafter DCC) (3.74 moles) were charged to a ten liter reactor along with, as catalyst, 7.5 g of Cu(I)Cl. The reactor had been fitted with a mechanical stirrer, nitrogen sparge, and a temperature control thermocouple. The temperature was set to 130° C. The progress of the reaction was monitored by IR analysis by means of the reduction of a peak at 2130 cm$^{-1}$ which indicated the consumption of DCC and the growth of a peak at 1640 cm$^{-1}$ which indicated formation of the guanidine end groups. An IR spectrum taken after 1120 minutes showed that reaction was essentially complete so the product was cooled and discharged.

EXAMPLE 19

This example illustrates the synthesis of an imino-functional softblock wherein the imino-functionalities are isourea groups.

5000 g of PPG 2000 (2.5 moles), 1289.0 g of DCC (6.25 moles) and 12.5 g of Cu(I)Cl as catalyst were charged to a ten liter reactor which had been fitted with a mechanical stirrer, nitrogen sparge, and temperature control thermocouple. The temperature was set to 130° C. The progress of the reaction was monitored by IR analysis by means of the reduction of a broad OH band at 3500 CM$^{-1}$ which indicated the comsumption of PPG 2000, the reduction of a peak at 2130 cm$^{-1}$ which indicated the consumption of DCC, and the growth of a peak at 1660 cm$^{-1}$ which indicated formation of isourea end groups. An IR spectrum taken after 110 minutes indicated that the reaction had started. After 1210 minutes another gram of catalyst was added since an IR spectrum indicated that the rate of reaction had slowed greatly. After 1475 minutes an IR spectrum showed no further reduction in the OH peak so the reaction was considered complete and the heat was turned off after 1490 minutes.

EXAMPLE 20

This example illustrates the synthesis of a polyurea from isourea-functional reactants.

An isocyanate-terminated prepolymer was formed by sequentially adding 26.54 pbw of T-3275 and 25.38 pbw of D-2000 to 49.94 pbw of ISOCYANATE-24. This prepolymer was impingement mixed with the following "control" and "Example 20" "B" components wherein "isourea" refers to the isourea softblock generated as in Example 19.

| Control | | Example 20 | |
|---|---|---|---|
| PPG 2000 | 60 pbw | Isourea | 60 pbw |
| DETDA | 40 pbw | DETDA | 40 pbw |

The weight ratio of the "A" component to the "B" component was 1.64. The isocyanate index was 105. The components were maintained at a temperature of 40° C. before being impingement mixed at a pressure of 200 bar and injected into a mold preheated to 100° C. The following table gives the physical properties of test plaques molded from the control and Example 20 formulations Units are the same as in Table 5.

| | Control | Isourea |
|---|---|---|
| $E_{flex}$ | 423 | 579 |
| Shore D hardness | 60 | 66 |
| Density | 1075 | 1089 |
| Heat Sag | | |
| 30" | 1 | 0 |
| 60" | 1 | 6.5 |
| CLTE | 121 | 122 |

EXAMPLE 21

A prepolymer was made by adding 49.1 parts by weight of D-2000 to 50.9 parts by weight of LF-209. The prepolymer, which had an isocyanate content of 14.50 wt. % was employed as the "A" component and reacted with a "B" component having the following composition:

| | |
|---|---|
| catalyst and internal mold release agent | 2.5 pbw |
| D-400 | 50 pbw |

| | |
|---|---|
| -continued | |
| DETDA | 50 pbw |

The formulation was processed on a Battenfeld SHK 65 RIM machine wherein the "A" component was maintained at 40° C. and the "B" component was maintained at 40° C. before being impingement mixed and injected into a mold which had been preheated to 65° C. The hardblock content of the processed formulation was 65 wt. %.

EXAMPLE 22

The same formulation was processed as in Example 15, except that D-400 in the "B" component was replaced with an equal amount of D-400 C.H. The weight ratio of "A" to "B" components was also adjusted to take into account the difference in equivalent weight of D-400 to D-400 C.H. The "B" component thus contained (pbw)

| | |
|---|---|
| catalyst and internal mold release agent | 2.5 pbw |
| D-400 C.H. | 50 pbw |
| DETDA | 50 pbw |

The hardblock content of the processed formulation was 66 wt. %.

It was noted that the formulation of Example 16 which employed an imino-functional chain extender and which is within the scope of this invention, gave much better flow than the formulation of Example 15 which employed the corresponding aliphatic amine and is not within the invention. More specifically, the gel time was well less than one second for the formulation of Example 15 but was ca. 1.6 seconds for Example 16. The mold residence time was twenty seconds for both formulations. This demonstrates superior flow without loss of system cycle time by using an imino-functional chain extender.

Table 5 gives the physical properties for test plaques molded from the formulations of Examples 15 and 16. The test plaques were one foot squares having a thickness of 3 mm.

TABLE 6

| Example | 21 | 22 |
|---|---|---|
| E$_{flex}$ (MPa) | 1,046 | 980 |
| Density (Kg/M$^3$) | 1,080 | 1,050 |
| Shore D Hardness | 69 | 69 |
| Tensile Str. (KPa) | 17,850 | 30,800 |
| Elongation (%) | 10 | 111 |
| CLTE* ($\alpha \cdot 10^6$/°C.) | 140 | 134 |
| Impact (joules) | | |
| Room Temp. | 5.02 | 9.00 |
| −20° C. | 2.51 | 3.05 |

*CLTE = Coefficient of Linear Thermal Expansion

EXAMPLE 23

This example illustrates the synthesis of a polyurea from guanidine-functional reactants.

An isocyanate-terminated prepolymer was formed by sequentially adding 26.54 pbw of T-3275 and 25.38 pbw of D-2000 to 49.94 pbw of ISOCYANATE-24. This prepolymer was impingement mixed with the following "B" component wherein "guanidine" refers to the guanidine softblock generated as in Example 18.

| Example 23 | |
|---|---|
| Guanidine | 60 pbw |
| DETDA | 40 pbw |

The weight ratio of the "A" component to the "B" component was 1.58. The isocyanate index was 105. The components were maintained at a temperature of 40° C. before being impingement mixed at a pressure of 200 bar and injected into a mold preheated to 100° C. The following table gives the physical properties of test plaques molded from the Example 23 formulations. Units are the same as in Table 5.

| | |
|---|---|
| E$_{flex}$ | 592 |
| Shore D hardness | 63 |
| Density | 1098 |
| Heat Sag | |
| 30" | 19 |
| CLTE | 126 |

This invention further provides internal mold release compositions suitable for use in reaction injection molding.

The production of molded articles, for example automotive body parts, from organic polyisocyanates and isocyanate-reactive components by the reaction injection molding (RIM) process is well established. The RIM process is eminently suited to the mass production of isocyanate-based molded articles, it is essential to its successful and economic operation, however, that the molded product can be easily removed from the mold without being damaged. One method of facilitating demolding is to coat the internal surfaces of the mold with a mold release agent, for example a wax or soap. This procedure has the disadvantage that application of the release agent has to be repeated almost every time the mold is used, adding substantially to the time and cost of the process.

In order to overcome the problems associated with external mold release agents, it has been proposed to use release agents of the internal type pre-blended with either the polyisocyanate or the isocyanate-reactive component. One type of internal release agent which has been successfully used in the production of other molded plastics articles comprises metal carboxylates such as zinc stearate. Unfortunately, such salts are soluble in neither the polyisocyanate nor with most of the usual isocyanate-reactive components. It has been proposed, therefore, to use the metal salts in conjunction with certain materials which have the effect of compatibilizing the salts with the isocyanate-reactive compounds. Thus, for example, it has been proposed in European Patent Publication Nos. 119471, 173888 and 190317 to employ various amino compounds as compatibilisers.

It has now been determined that imino- and enamine-containing compounds show superior performances to those of the amino compounds proposed in the prior art, when used with metal salts of organic acids and the isocyanate-reactive compounds in the manufacture of molded polyurethane, polyurea and like polymers by processes such as the RIM-process. "Containing" as used above with imino- or enamino- is a synonym for "functional".

This invention thus further provides an internal mold release composition comprising an internal mold release agent and an imino-functional compound. In a preferred embodiment the internal mold release agent is a metal salt of an organic acid, said metal salt having mold release properties, and the imino-functional compound is used in a compatibilizing amount and has a molecular weight less than 1500, preferably less than 600. Instead of, or in addition to, the imino-functional compound, an enamino-functional compound may be employed. In another preferred embodiment the internal mold release composition comprises an internal mold release agent, preferably a metal salt of an organic acid, an imino-functional or enamino-containing compound, and an aromatic polyamine.

The expression "a compatibilizing amount" used herein means an amount of the imino-functional compound or enamine containing compound sufficient to provide a substantially stable solution or dispersion of mold release composition in isocyanate-reactive compound or compounds. Clearly, this amount will vary depending on the nature of the metal salt, the nature of the isocyanate-reactive compound and their relative proportions as well as on the nature of the compatibilizer.

The metal salts present in the compositions of the invention may be any salt which are derived from organic acids and which have mold release properties. Such salts have been fully described in the prior art relating to the molding of polyurethanes, polyureas and other resins.

The organic acids from which the salts may be derived particularly include carboxylic acids containing from 8 to 24 carbon atoms. Such acids may be aromatic or cycloaliphatic but are preferably aliphatic monocarboxylic acids which may be straight-chain or branched, saturated or unsaturated and may carry substituents such as hydroxy, amino or amido groups. The most preferred aliphatic monocarboxylic acids are the so-called "fatty acids" having from 10 to 18 carbon atoms, for example lauric, palmitic, stearic, isostearic, oleic, linoleic and ricinoleic acids and mixtures of any of these.

The metal salts may be salts of any metal of Groups I and II of the Periodic Table or of other metals such as chromium, molybedenum, iron, cobalt, nickel, aluminium, tin, lead, antimony or bismuth. The preferred metals are lithium, magnesium, calcium, barium, iron, cobalt, nickel, copper, zinc, cadmium and aluminum and mixtures thereof.

As examples of particularly suitable salts there may be mentioned zinc stearate, zinc oleate, zinc palmitate, zinc laurate, zinc octoate, zinc behenate, zinc ricinoleate and the calcium, magnesium, nickel and copper salts of lauric, palmitic, stearic and oleic acids. The most preferred salt is zinc stearate.

The imino-functional compounds and the enamine containing compounds used as compatibilizers in the compositions of the invention are preferably capable of reacting with isocyanates, without the liberation of monomeric by-products.

"Imino-functional" as used herein has the meaning previously given. The imino-functional compounds suitable for use in internal mold release compositions include all of the types previously discussed and exemplified, including those set forth in TABLE A. Methods for making the compounds are also as previously set forth.

The imino-functional compounds should contain at least one imino unit per molecule, preferably from 2 to 4 such units. Preferred compounds have molecular weights not greater than 1500, preferably in the range from 100 to 600.

Preferred imino-functional compounds for use in internal mold release compositions include the aliphatic polyether resins terminated with aliphatic imine groups, as previously discussed, which can be made by reacting a low molecular weight amine-terminated polyether resin (of the type commercially available under the registered trademark JEFFAMINE) with an aldehyde or ketone to form, respectively, the corresponding aldimine or ketimine.

Suitable amine-terminated resins for use in making the preferred imino-functional aliphatic polyethers include those sold commercially under the designation JEFFAMINE D-400 or JEFFAMINE D-230.

Suitable imino-functional polyethers may also be prepared starting with the analogous polyether polyols, i.e. the hydroxyl-terminated analogous of amine-terminated polyethers, as previously set forth.

Examples of other compounds useful in internal mold release compositions include simple bis-ketimines or bis-aldimines of 1,6-hexamethylene diamine, isophorone diamine, menthane diamine, and the like; bis-oxazolines, bis-thiazolines, or bis-imidazolines derived from adiponitrile or adipic acid, etc.

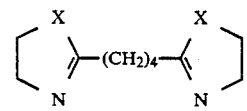

where
X is O, S, NH, N—R, or N—Ar;
R is a monovalent aliphatic organic group of 1 to 10 carbons and Ar is an aromatic organic group of 6 to 18 carbons.

The ketimines or aldimines are made by reacting any of these compounds with any suitable aldehyde or ketone including those previously set forth.

The enamines which may be used include in particular compounds, having one or more of the following isocyanate-reactive functional groups:

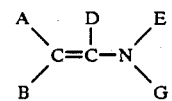 (II)

and/or

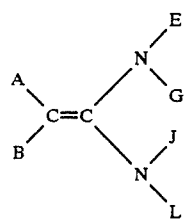 (III)

wherein A, B, D, E, G, J, and L are chemical moities which collectively form the rest of the compound. Any two or more of these moieties may be connected, in the form of a ring. Said rings may be carbocyclic or heterocyclic. Each of said groups A, B, D, E, G, J, and L are independently selected from the group consisting of H and organic radicals which are attached to the enamine structural unit(s)

C=C—N of said compound through N, C, O, S, Si, or P; each of the two carbon atoms of said unit being bonded to three atoms.

In the above structures, neither of the enamine carbon atoms nor the nitrogen atom (or atoms) should be incorporated within an aromatic or other fully conjugated ring or ring system. It is preferred that none of the groups E, G, J, or L is a hydrogen atom. It is further preferred that all organic substituents attached to said enamine structural unit(s)

C=C—N are attached through saturated aliphatic carbon atoms.

Many simple enamines (structure II) can be prepared by reacting an aldehyde or ketone with a secondary amine, under conditions which provide for removal of H₂O. This process is very well known in the art and is analogous to the formation of simple ketimines or aldimines (outlined above). In the case of enamines, the ketone/aldehyde component used in the preparation must contain at least one hydrogen atom on at least one of the carbon atoms next to the carbonyl carbon (i.e. at least one alpha hydrogen atom).

More complex enamines (i.e. structure III) are also known in the art. Methods for their preparation are straightforward, and are described in J. Org. Chem. 29, 2932 (1964) and references cited therein. See also U.S. Pat. No. 4,342,841. These documents are incorporated herein by reference. A preferred route to these types of enamines involves the reaction of an orthoester with an excess of a secondary amine, in the presence of an acid acceptor. Said orthoester must contain at least one alpha hydrogen atom, attached to a carbon atom adjacent to the orthoester carbon.

Some applications of enamines in polyurethane chemistry are described in U.S. Pat. Nos. 4,342,841 and 4,552,945 and in A.C.S. P.M.S.E. Division Preprints for August/September 1983 (vol. 49), ppgs. 456–464; and references cited therein. The enamines, which are preferred for solubilizing/dispersing internal mold release additives of the fatty acid metal salt type, into RIM formulations are the lower molecular weight enamines (i.e. those of molecular weight less than 1500, preferably less than 600, and most preferably less than 300).

Mixtures of imino-functional compounds and/or enamine containing compounds may be present in the compositions if desired.

The compositions of the invention typically contain from about 0.1 to about 40% preferably from about 1 to about 20% of metal salt on a weight basis.

The compositions may be conveniently prepared by agitating one or more metal salts as hereinbefore defined with one or more imino-functional compounds and/or enamine containing compounds at ambient or elevated temperatures until a clear solution is obtained. In some cases, stirring for several hours at temperatures of up to 80° C. or even higher may be necessary.

As indicated above, the internal mold release compositions of the invention are useful in the production of molded articles by a process comprising reacting in a suitable mold a polyisocyanate composition with a isocyanate-reactive composition comprising one or more compounds containing a plurality of isocyanate-reactive groups in the presence of said mold release composition.

In order to facilitate the incorporation of the internal mold release composition of the invention into the reaction mixture used in the molding process, it is usually desirable to pre-blend said composition into at least part of the isocyanate-reactive composition employed in the process.

Accordingly, in another aspect of the invention, there is provided an isocyanate-reactive composition comprising at least one compound having a plurality of isocyanate-reactive groups having dissolved or dispersed therein an effective amount of an internal mold release composition comprising:

(a) a metal salt of an organic acid, said metal salt having mold release properties, and (b) a compatibilizing amount of an imino-functional compound or an enamine containing compound, the metal salt being incompatible with the compound having a plurality of isocyanate-reactive groups in the absence of the compatibilizer.

Said isocyanate-reactive composition may be prepared by combining all the ingredients in a single operation (stirring and heating as necessary to provide for complete solubilization) or, if desired, by pre-blending any two or more of the individual ingredients.

The expression "an effective amount" used herein means an amount of the mold release composition of the invention sufficient to provide acceptable mold release when the isocyanate-reactive composition is used in a molding process. Where the isocyanate-reactive composition contains more than one isocyanate-reactive compound, the requirement of incompatibility with the metal salt means that the metal salt is incompatible with at least one of the isocyanate-reactive compounds present in the composition.

Compounds containing a plurality of isocyanate-reactive groups which may be present in the isocyanate-reactive compositions of the invention include compounds having molecular weights of from about 60 to about 12000, containing an average of two or more isocyanate-reactive groups per molecule. Examples of isocyanate-reactive groups which may be present in these compounds include hydroxyl, thiol, primary amino, secondary amino, imino-functional and enamine groups, and mixtures of such groups.

Particularly important isocyanate-reactive compositions for use in RIM processes contain a combination of a relatively high molecular weight polymer containing a plurality of isocyanate-reactive groups (usually referred to as a "softblock") and a relatively low molecular weight compound containing a plurality of isocyanate-reactive groups, usually known as a chain extender.

Thus, in a further aspect of the invention, there is provided an isocyanate-reactive composition comprising:

(i) at least one polymer containing a plurality of isocyanate-reactive groups and having a number average molecular weight of from 1500 to about 12000;

(ii) at least one chain extender having a molecular weight less than 1500, and (iii) an effective amount of an internal mold release composition comprising:

(a) a metal salt of an organic acid, said metal salt having mold release properties, and (b) a compatibilizing amount of an imino-functional compound or an enamine containing compound, the metal salt being incompatible with the combination of (i) and (ii) in the absence of the compatibilizer.

Polymers containing a plurality of isocyanate-reactive groups which may be present in the isocyanate-reactive compositions of the invention include polyols, polyamines, imino-functional polymers, enamine containing polymers and mixtures thereof.

Polymeric polyols having molecular weights in the range from 1500 to about 12000 are well known as polyurethane components and may be prepared by methods fully described in the prior art. As examples of suitable polyols there may be mentioned polythioethers, polyesters, polyesteramides, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water, polyols, for example ethylene glycol, propylene glycol, diethylene glycol, resorcinol, bisphenol A, glycerol, trimethylolpropane, 1,2,6-hexanetriol, triethanolamine, pentaerythritol, sorbitol or sucrose, ammonia, primary monoamines, for example aniline or benzylamine, polyamines, for example ethylene diamine, hexamethylene diamine, toluene diamines, diaminodiphenylmethanes and polymethylene polyphenylene polyamines obtained by the condensation of aniline and formaldehyde, and aminoalcohols, for example ethanolamine and diethanolamine. Mixtures of initiators and/or cyclic oxides may be used.

Especially useful polyether polyols include polyoxypropylene and poly(oxyethylene-oxypropylene) diols and triols obtained by the simultaneous or sequential addition of ethylene and propylene oxides to appropriate di- or trifunctional initiators as fully described in the prior art. Mixtures of the said diols and triols are often particularly useful.

Because of their enhanced reactivity, ethylene oxide tipped polyols are often preferred.

Polyester polyols which may be used include hydroxyl terminated reaction products of polyhydric alcohols such as ethylene glycol, propylene glycol, diethylene glycol, 1,4-butanediol, polyether polyols, bis(hydroxyethyl) terephthalate, glycerol, trimethylolpropane or penaerythritol or mixtures thereof with polycarboxylic acids, especially dicarboxylic acids or their ester-forming derivatives, for example succinic, glutaric and adipic acids or their dimethyl esters, sebacic acid phthalic anhydride, tetrachlorophthalic anhydride or dimethyl terephthalate. Polyesters obtained by the polymerisation of lactones, for example caprolactone, in conjunction with a polyol, may also be used. Polyesteramides may be obtained by the inclusion of aminoalcohols such as ethanolamine in polyesterification mixtures.

Polythioether polyols which may be used include products obtained by condensing thiodiglycol (either alone or with other glycols), with dicarboxylic acids, formaldehyde, alkylene oxides, aminocarboxylic acids, or combinations thereof.

Polycarbonate polyols which may be used include products obtained by reacting diols such as 1,3-propanediol, 1,4-butanediol, 1,6-hexanediol, diethylene glycol or tetraethylene glycol with diaryl carbonates, (for example diphenyl carbonate), with cyclic carbonates (i.e. ethylene carbonate), or with phosgene.

Polyacetal polyols which may be used include those prepared by reacting glycols such as diethylene glycol, triethylene glycol or hexanediol with formaldehyde. Suitable polacetals may also be prepared by polymerising cyclic acetals.

Suitable polyolefin polyols include hydroxy-terminated homo- and copolymers and suitable polysiloxane polyols include polydimethylsiloxane diols and triols, wherein the hydroxyl groups are organically bound.

Polymeric polyamines having molecular weights in the range from 1500 to about 12000 are well known as components of polyurea forming reaction mixtures and may be prepared by methods fully described in the prior art. As examples of suitable polyamines, there may be mentioned amino-terminated polythioethers, polyesters, polyesteramides, polycarbonates, polyacetals, polyolefins, polysiloxane and, especially, polyethers obtained by replacing the hydroxy groups of the corresponding polyols partially or completely by secondary or preferably primary amino groups. The preferred polymeric polyamines are polyether diamines and triamines, especially polyoxypropylene diamines and triamines.

Imino-functional polymers having molecular weights in the range from 1500 to about 12000 contain a plurality of imino-functional groups as hereinbefore described and may be prepared by the general methods described above. The preferred imino-functional polymers are imine-terminated polyethers such as may be obtained for example by reacting an aldehyde or ketone with a polyether polyamine, especially a polyoxypropylene diamine or triamine.

Enamine functional polymers may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the H$_2$O formed in the reactions. Secondary amine terminated resins can be obtained, for example by catalytic hydrogenation of the imino-functional polymers described hereinabove. Ketone/aldehyde terminated resins may be obtained, in general, by oxidation of the corresponding secondary or primary hydroxyl terminated resin. More highly reactive enamine functional polymers can be prepared by oxidizing a primary hydroxy functional resin to the corresponding polycarboxylic acid, conversion of the said groups to orthoesters, and treatment of the latter with an excess of a secondary amine. Each orthoester must contain at least one alpha hydrogen atom.

Polymers containing a plurality of isocyanate-reactive groups for inclusion in the isocyanate-reactive compositions of the invention preferably have molecular weights in the range from 2000 to 8000 and have isocyanate-reactive functionalities of from 2 to 4, especially 2 or 3.

Chain extenders having molecular weights below 1500 which may be present in the isocyanate-reactive compositions of the invention have been fully described in the prior art and include polyols and polyamines, especially diols and diamines.

Mixtures of different chain extenders may be used if desired. Preferred chain extenders have molecular weights below 800 and often below 500.

Polyols which may be used as chain extenders include ethylene glycol and 1,4-butanediol.

Polyamines which may be used as chain extenders include aliphatic polyamines, especially diamines, and aromatic polyamines, especially sterically hindered diamines.

Ethylene diamine and low molecular weight polyether diamines are examples of suitable aliphatic polyamines. Suitable aromatic diamines include 3,5-diethyl-2,4-toluene diamine, 3,5-diethyl-2, 6-toluene diamine and mixtures thereof, (referred to as DETDA) 4,4'- and 2,4'-diaminodiphenylmethanes and mixtures thereof, 2,4- and 2,6-diaminotoluenes and mixtures thereof, 1,3,5-triisopropyl-2,4-diaminobenzene, 3,3',5,5'-tetraisopropyl-4,4'-diaminodiphenylmethane and the like.

The relative proportions of isocyanate-reactive polymer and chain extender present in the isocyanate-reactive compositions of the invention generally conform to the teachings of the prior art. The concentration of internal mold release composition in the isocyanate-reactive composition is typically such that the latter contains from about 0.1 to about 10% by weight of metal salt, preferably from about 1% to about 5%. If desired, however, a more concentrated solution or dispersion of internal mold release composition in one or more compounds containing a plurality of isocyanate-reactive groups may be prepared to act as a masterbatch to be mixed with further isocyanate-reactive compound before being used in the molding process.

The molding process comprises reacting a polyisocyanate composition with an isocyanate-reactive composition of the invention in a suitable mold.

Accordingly, in a still further aspect of the invention, there is provided a reaction system for use in making a molded article, said system comprising the following components:

(1) a polyisocyanate composition, and (2) an isocyanate-reactive composition comprising at least one compound having a plurality of isocyanate-reactive groups having dissolved or dispersed therein an effective amount of an internal mold release composition comprising:

(a) a metal salt of an organic acid, said metal salt having mold release properties, and (b) a compatibilizing amount of an imino-functional compound or an enamine containing compound, the metal salt being incompatible with the compound having a plurality of isocyanate-reactive groups in the absence of the compatibilizer.

The invention also provides a reaction system for use in making a reaction injection molded article, said system comprising the following components:

(1) a polyisocyanate composition, and (2) an isocyanate-reactive composition comprising:

(i) at least one polymer containing a plurality of isocyanate-reactive groups and having a number average molecular weight of from 1500 to about 12000;

(ii) at least one chain extender having a molecular weight less than 1500, and (iii) an effective amount of an internal mold release composition comprising:

(a) a metal salt of an organic acid, said metal salt having mold release properties, and (b) a compatibilizing amount of an imino-functional compound or an enamine containing compound, the metal salt being incompatible with the combination of (i) and (ii) in the absence of the compatibilizer.

Suitable polyisocyanates include those previously set forth. Mixtures of polyisocyanates can be used and also polyisocyanates which have been modified by the introduction of urethane, allophanate, urea, biuret, carbodiimide, uretonimine or isocyanurate residues. In general, the aromatic polyisocyanates are preferred, especially the available MDI isomers, that is to say 4,4'-diphenylmethane diisocyanate, 2,4'-diphenylmethane diisocyanate and mixtures thereof.

The reaction systems set forth above may contain conventional additives as previously set forth. Said additives include catalysts, for example tin compounds and tertiary amines, surface-active agents and foam stabilizers, for example siloxaneoxyalkylene copolymers, blowing agents, for example water and low boiling halogenated hydrocarbons, flame retardants, plasticisers, dyes, fillers and reinforcing agents.

The reaction systems may be processed as previously set forth, by RIM processing. RIM processes which may be used include structural (including mat-reinforced) RIM and amine-extended RIM processes.

The invention is illustrated but not limited by the following Examples:

EXAMPLE 24

This example illustrates the laboratory preparation of an imine-terminated polyether.

450 g of Jeffamine 400 (an amine terminated polyether from Texaco, having a Mw of about 400), 225 g of cyclohexanone, and 225 g of toluene was placed in a 1 liter reaction kettle. A condenser column was placed atop the reaction kettle on one neck, a gentle dry nitrogen flow was maintained at the top of the condenser, while through a second neck the kettle was equipped with a thermometer. Agitation of the reaction mixture with a glass stir shaft and a stir paddle made from polytetrafluoroethylene (TEFLON, DuPont) was implemented through the third neck and heat was applied with a heating mantle until reflux, about 70° C. Reflux was continued for one hour.

The temperature was decreased until reflux stopped, and agitation was discontinued. The reflux column was replaced with a distillation column and nitrogen flow was implemented into the reaction vessel and out through the distillation column. Agitation was restarted and sufficient heat was applied to maintain a steady distillation rate of residual cyclohexanone. When distillation was complete the reaction kettle was equipped with vacuum by attaching the vacuum source (i.e. a pump) to the distillation receiver flask.

The apparatus was sealed by using silicone grease to lubricate joints. Vacuum was begun gradually with gentle stirring at 70° C., the vacuum pressure being ultimately decreased to less than 1.5 torr for one hour. The temperature was gradually increased during this distillation to 130° C. to distill toluene.

The vacuum was then broken and the reaction tested for completion by infrared (IR) spectroscopy of the product. The absence of a carbonyl peak at $1710 \text{ cm}^{-1}$, indicated that residual cyclohexanone had been completely removed. The absence of an amine peak at $1600-1610 \text{ cm}^{-1}$ indicated that D 400 had reacted completely. The presence of an imine peak at $1660 \text{ cm}^{-1}$ indicated the formation of the desired D 400-cyclohexanone. The intensity of a reference peak at $1490 \text{ cm}^{-1}$, present in both reactant and product spectrums, was used to gauge the pressure which was applied to the salt cells to achieve roughly the same thickness of each sample monitored.

EXAMPLE 25

This example illustrates the preparation of internal mold release compositions in accordance with the invention using the imine terminated polyether of example 24.
  a. A clear liquid internal mold release composition containing 4.8% by weight of mold release agent was prepared by stirring for about 6 to 8 hours at room temperature, a mixture of
    50 parts by weight of D 400-cyclohexanone-imine
    2.5 parts by weight of Zinc Stearate.
  b. A clear liquid internal mold release composition containing 22.2% by weight of mold release agent was prepared by stirring for about 6 to 8 hours at a temperature of about 80° C. a mixture of
    7 parts by weight of D 400-cyclohexanone-imine
    2 parts by weight of Zinc Stearate.

EXAMPLE 26

This example illustrates the preparation of an isocyanate-reactive composition in accordance with the invention using a polyether diimine.

A clear isocyanate-reactive composition suitable for RIM-processes was obtained by mixing at room temperature:
10 g of an internal mold release composition consisting of
  80 w. % of D 400-cyclohexanone-imine and 20 w. % of Zinc Stearate;
80 g of a high molecular weight ethylene oxide tipped triol, having an hydroxyl value of 28 mg KOH/g, commercialized by ICI under the trade mark DALTOCEL F 2805,
20 g of DETDA.

EXAMPLE 27

This example illustrates the IMR (internal mold release) effect of an isocyanate-reactive composition in accordance with the invention in a polyurea RIM-process.

A prepolymer was made by adding 49.1 parts by weight of Jeffamine D-2000 (amine terminated polyether from Texaco) to 50.9 parts by weight of pure MDI containing ca. 20% 2,4'-isomer. The prepolymer, which had an isocyanate content of 14.5 wt. percent was employed as the "A" component and reacted with a "B" component having the following composition:
  50 parts by weight of DETDA,
  2.5 parts by weight of Zinc Stearate and
  50 parts by weight of D-400 cyclohexanonediimine (i.e. 50 pbw of DEDTA and
  52.5 pbw of the internal mold release composition of example 25(a).

The hardblock content of the processed formulation was 66 wt. percent.

The formulation was processed on a Battenfeld SHK-65 RIM machine wherein the "A" component was maintained at 40° C. and the "B" component was maintained at 40° C. The two streams were impingement mixed and injected into a 30 cm×30 cm×3 mm (thickness) square test plaque mold which had been preheated to 65° C.-70° C.

It was noted that the formulation of this example, which used a relatively low molecular weight imino functional compound to solublize the IMR (Zinc Stearate), showed self-release properties. More than 25 consecutive test plaques were removed from the mold with a single application of a standard wax and soap (chemtrend XMR 2008, XMR 2006) pretreatment of the mold.

EXAMPLE 28

This example illustrates the laboratory preparation of a diimine from an aliphatic diamine. 2905 g of an 80% solution of hexamethylenediamine in water and 5289 g of cyclohexanone were charged to a 10 liter round-bottomed flask filled with a nitrogen sparge tube, mechanical stirrer and a Dean-stark trap.

The reagents were heated to 160° C. by means of an electric isomantle controlled via a thermocouple immersed in the reaction medium. At approximately 110° C. azeotropic distillation of a mixture of water and cyclohexanone commenced. Water was collected from the Dean-stark apparatus until after 380 minutes a total of 1250 ml had been removed.

At this point the Dean-stark apparatus was removed and replaced with a still-head and condensor. Excess cyclohexanone was then removed by distillation, the last fraction being removed using a reduced pressure of 20 mmHg for six hours at 160° C.

The vacuum was then broken and the product analysed by infrared (IR) spectroscopy. The absence of a carbonyl peak at 1715 cm$^{-1}$ indicated that residual cyclohexanone had been removed. The absence of an amine peak at 1600-1610 cm$^{-1}$ indicated that the hexamethylenediamine had reacted completely. The presence of an imine peak at 1660 cm$^{-1}$ indicated the formation of the desired N,N'-dicyclohexylidene hexamethylenediamine (cyclohexanone imine of hexamethylenediamine).

EXAMPLE 29

This example illustrates the preparation of an internal mold release composition in accordance with the invention, using the aliphatic diimine of example 28.

A clear internal mold release composition containing 3% by weight of mold release agent was prepared by mixing:
  97 parts by weight of hexamethylene dicyclohexanone imine
  3 parts by by weight of Zinc Stearate.

EXAMPLE 30

These examples illustrate the preparation of isocyanate-reactive compositions in accordance with the invention using an aliphatic diimine.
  a. A clear stable isocyanate reactive composition suitable for RIM-processes was obtained by mixing at room temperature
    40 g of a clear solid internal mold release composition consisting of 95 w. % of hexamethylene dicyclohexanone-imine and 5 w. % of Zinc Stearate
    71 g of an ethylene oxide tipped triol, having an hydroxyl value of 35 mg KOH/g, commercialized by ICI under the trade mark DALTOCEL F3507
    27 g of DETDA.
  b. A clear stable isocyanate reactive composition suitable for RIM-processes was obtained by mixing at room temperature
    10 g of a clear solid internal mold release composition consisting of 20 w. % of Zinc Stearate and 80 w. % of hexamethylene dicyclohexanone imine 80 g of an ethylene oxide tipped triol having an hydroxyl value of 28 mg KOH/g, commericalized by ICI under the trade mark DALTOCEL F 2805.

EXAMPLE 31

This example illustrates the laboratory preparation of tricyclohexylguanidine. 196.4 g of cyclohexylamine and 412.7 g of dicylcohexylcarbodiimide were charged to a 1 liter flask fitted with a mechanical stirrer and nitrogen sparge tube. The stirred reaction mixture was warmed to 180° C. with a gentle flow of dry nitrogen. The progress of the reaction was monitored by infrared spectroscopy. The consumption of the dicyclohexylcarbodiimide was followed by observing a decrease in the intensity of the absorption at 2130 cm$^{-1}$. After 15 hours, when no further decrease in this signal was observed, the reaction mixture was cooled and discharged to give a white crystaline solid with melting point this signal was observed, the reaction mixture was cooled and discharged to give a white crystaline solid with melting point of approx. 80° C.

EXAMPLE 32

This example illustrates the preparations of an internal mold release composition and of isocyanate-reactive compositions in accordance with the invention, using the imino functional compound of example 31. A haizy solid internal mold release composition containing 20% by weight of mold release agent was prepared by mixing at 80° C. and cooling, a mixture of 80 g of tricyclohexylguanidine and 20 g of Zinc Stearate.

Clear isocyanate-reactive compositions suitable for RIM-processes could be made by combining this solid internal mold release at room temperature with polyols and DETDA, in the manners described in example 26 and 30.

EXAMPLE 33

This example illustrates the laboratory preparation of hexamethylene diisobutyraldehyde imine. 1162 g of hexamethylenediamine, 1656 g of isobutyraldehyde and 500 g of molecular sieves (dried under vacuum at elevated temperature) were charged to a 5 liter round-bottomed flask fitted with a nitrogen sparge tube, mechanical stirrer and reflux condensor. On combining the reagents an exothermic reaction occurred which caused the temperature of the reaction mixture to rise to 77° C. When this exotherm subsided, additional heat sufficient to maintain a steady reflux was supplied via an electric isomantle.

After 6.5 hours an absorption at 1660 cm$^{-1}$ in the infrared spectrum of the reaction mixture indicated formation of the desired product. The reflux condensor was replaced with a still-head and condensor and excess isobutyraldehyde was removed by distillation. The final traces of aldehyde were removed by the use of reduced pressure, as indicated by the absence of an absorption at 1740 cm$^{-1}$ in the infrared spectrum of the product. The reaction mixture was then cooled and the spent molecular sieves removed by filtration.

EXAMPLE 34

This example illustrates the preparations of an internal mold release composition and of an isocyanate-reactive composition in accordance with the invention using the aliphatic diimine of example 33.

a. A liquid internal mold release composition containing 10% by weight of mold release agent was obtained by heating for 16 hours at 80° C. a mixture of 90 parts by weight of hexamethylene diisobutyraldehyde imine and 10 parts by weight of Zinc Stearate.

b. 20 g of the liquid composition of example 34a, 64 g of a high molecular weight ethylene oxide tipped triol having an hydroxyl value of 28 mg KOH/g, commercialized by ICI under the trademark DALTOCEL F 2805, and 16 g of DETDA were stirred for 2 hours at 80° C. to give a clear liquid isocyanate reactive composition suitable for RIM-processes, which became a hazy paste upon cooling to room temperature.

What is claimed is:

1. An isocyanate-reactive polymeric resin forming composition comprising
(i) a chain extender comprising
   (a) 0-100% of an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and, correspondingly,
   (b) 100-0% of an imino-functional aliphatic compound having a number-averaged molecular weight less than 1500 and a number-averaged functionality of isocyanate-reactive imino groups of about 1 to about 3, and
(ii) an imino-functional polyether resin having an average of from about 1.1 to about 5 isocyanate-reactive imino groups per molecule and a number-averaged molecular weight of from 1500 to about 10,000, wherein said imino groups constitute at least 50 mole percent of the isocyanate-reactive groups in said polyether resin, and at least 50 mole percent of said imino-functional polyether species contain two or more imino (C=N) groups per molecule.

2. A composition as defined in claim 1, wherein said lower molecular weight imino-functional component (i)(b) has a number averaged molecular weight less than about 600, a number averaged functionality of imino groups between about 1.2 and about 2.5, and consists of aliphatic species.

3. A composition as defined in claim 1, wherein said lower molecular weight imino-functional component (i)(b) comprises imino-functional polyether resins.

4. A composition as defined in claim 1, wherein said imino groups are simple imines.

5. A composition as defined in claim 1, wherein the imino groups of said imino-functional aliphatic compound and said imino-functional polyether resin are selected from among the following:

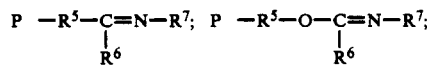

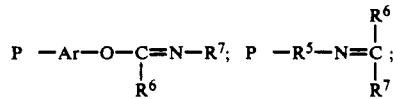

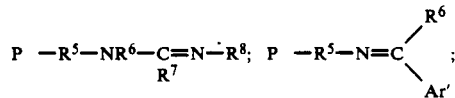

-continued

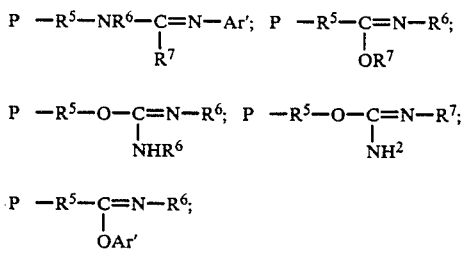

wherein:
$R^5$ and Ar are divalent aliphatic and aromatic organic linking groups, respectively;
P represents a polyether or hydrocarbon chain or radical, to which said imino (C=N) functional group is attached.
$R^6$ is H or a monovalent organic aliphatic group of 1 to 10 carbons;
$R^7$ and $R^8$ are monovalent aliphatic organic groups of 1 to 10 carbon atoms, and
Ar' is a monovalent aromatic organic group of 6 to 18 carbon atoms.

6. A composition as defined in claim 1, wherein said composition further comprises a solid filler or reinforcement.

7. A composition as defined in claim 1, wherein component (ii) is an aliphatic, iminofunctional, liquid resin based predominantly upon polyoxypropylene and has a molecular weight in the range of from about 2000 to about 8000 and a number averaged functionality of imino units from about 2 to about 5.

8. An isocyanate-reactive composition comprising
(i) a chain extender comprising an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and
(ii) an imino-functional chain extender having a molecular weight less than about 600 and a number-averaged functionality of imino units between about 1 and about 2.5, said imino groups being capable of reacting directly with isocyanates.

9. A composition as defined in claim 8, wherein said imino-functional chain extenders are simple imine derivatives made by reacting aliphatic mono and/or polyamines with at least one member selected from the group consisting of acetone, cyclohexanone, isobutyraldehyde, acetaldehyde, o-hydroxybenzaldehyde, cyclopentanone, 1-propanal, and 1-butanal.

10. A composition as defined in claim 8, wherein the imino groups of said imino-functional chain extender are selected from among the following types:

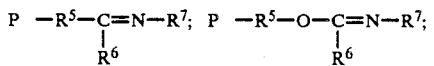

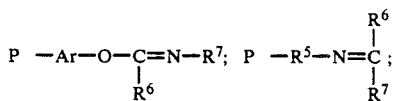

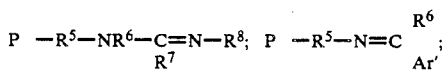

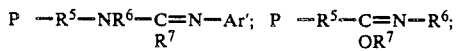

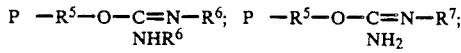

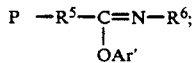

wherein:
$R^5$ and Ar are divalent aliphatic and aromatic organic linking groups, respectively;
P represents a polyether or hydrocarbon chain or radical, to which said imino functional group is attached.
$R^6$ is H or a monovalent organic aliphatic group of 1 to 10 carbons;
$R^7$ and $R^8$ are monovalent aliphatic organic groups of 1 to 10 carbon atoms, and
Ar' is a monovalent aromatic organic group of 6 to 18 carbon atoms.

* * * * *